(12) United States Patent
Watanabe et al.

(10) Patent No.: US 11,104,380 B2
(45) Date of Patent: Aug. 31, 2021

(54) DISPLAY CONTROLLER

(71) Applicant: AISIN SEIKI KABUSHIKI KAISHA, Kariya (JP)

(72) Inventors: Kazuya Watanabe, Kariya (JP); Kinji Yamamoto, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/775,360

(22) Filed: Jan. 29, 2020

(65) Prior Publication Data

US 2020/0239073 A1     Jul. 30, 2020

(30) Foreign Application Priority Data

Jan. 30, 2019    (JP) .............................. JP2019-014544

(51) Int. Cl.
     *G08G 1/14*          (2006.01)
     *B62D 15/02*        (2006.01)
     *B60Q 9/00*         (2006.01)

(52) U.S. Cl.
     CPC ......... *B62D 15/0275* (2013.01); *B60Q 9/005* (2013.01); *B60R 2300/102* (2013.01); *B60R 2300/806* (2013.01)

(58) Field of Classification Search
CPC .............. B60K 35/00; B60K 2370/166; B60K 2370/167; B60K 2370/179; B60K 2370/193; B60K 2370/152; B60K 2370/175; B60K 2370/52; B60K 37/06; B60K 2370/149; B60K 2370/171; B60K 2370/21; B60K 37/02; B60K 2370/1438; B60K 2370/168; B60K 2370/173; B60K 2370/331; B60K 2370/48; B60K 11/04; B60K 11/085; B60K 2370/126; B60K 2370/1434; B60K 2370/1446; B60K 2370/148; B60K 2370/1529; B60K 2370/1533; B60K 2370/155;

(Continued)

(56) References Cited

U.S. PATENT DOCUMENTS 8,633,811 B2 *   1/2014   Ikeda ........................ B60R 1/00
                                                                   340/441
8,638,811 B2 *   1/2014   Rajamani ............. H04B 7/0697
                                                                   370/465

(Continued)

FOREIGN PATENT DOCUMENTS

JP       2010-264953 A     11/2010
JP       2015-74260 A      4/2015

*Primary Examiner* — Daniel Previl
(74) *Attorney, Agent, or Firm* — Sughrue Mion, PLLC

(57) ABSTRACT

A display controller includes: an image data acquisition unit that acquires image data as a result of capturing an image with an image capturing unit which captures an image of a situation around a vehicle; and a display processing unit that displays a display screen which includes a first region displaying a surrounding image that is generated based on the image data and indicates the situation around the vehicle and a second region other than the first region on a display unit, and changes a display mode of at least a part of at least one of the first region and the second region on the display screen depending on whether or not proxy control is executed to perform at least a part of a driving operation of the vehicle by proxy for a driver.

6 Claims, 13 Drawing Sheets

(58) Field of Classification Search
CPC ........ B60K 2370/176; B60K 2370/182; B60K 2370/1868; B60K 2370/195; B60K 2370/197; B60K 2370/31; B60K 2370/334; B60K 2370/56; B60K 2370/67; B60K 2370/736; B60K 2370/739; B60K 2370/741; B60K 2370/744; B60K 2370/771; B60R 1/00; B60R 16/02; B60R 2300/607; B60R 2300/806; B60R 2300/70; B60R 21/00; B60R 2300/105; B60R 2300/20; B60R 2300/306; B60R 2300/308; B60R 2300/802; B60R 11/0235; B60R 1/002; B60R 1/003; B60R 1/04; B60R 1/12; B60R 2001/1253; B60R 2011/0028; B60R 2011/0082; B60R 2011/0092; B60R 2300/102; B60R 2300/202; B60R 2300/30; B60R 2300/303; B60R 2300/304; B60R 2300/305; B60R 2300/808; B60R 2300/8086; B60W 2050/146; B60W 50/14; B60W 2540/18; B60W 2540/215; B60W 30/06; B60W 2050/0079; B60W 2050/0089; B60W 2520/10; B60W 2540/10; B60W 2540/12; B60W 2540/20; B60W 2554/00; B60W 2720/10; B60W 30/09; B60W 30/18163; B60W 30/182; B60W 40/09; B60W 50/08; B60W 50/085; B60W 50/10; B60W 2050/143; B60W 40/105; B60W 2050/0064; B60W 10/04; B60W 10/18; B60W 10/20; B60W 2300/14; B60W 2420/42; B60W 2520/22; B60W 30/00; B60W 30/02; B60W 30/045; B60W 30/18036; B60W 50/0097; G06K 9/00791; G06K 9/00288; G06K 9/00671; G06K 9/00832; G06K 9/00805; G06K 9/00812; G06K 9/00798; B62D 15/0285; B62D 15/027; B62D 15/028; B62D 15/02; B62D 15/0275; B62D 13/06; G08G 1/168; G08G 1/0962; G08G 1/096888; G08G 1/16; G08G 1/056; G08G 1/09623; G08G 1/09626; G08G 1/143; G08G 1/144; G08G 1/145; G08G 1/167; G09G 2380/10; G09G 2340/04; G09G 2340/14; G09G 5/00; G09G 3/001; G09G 5/02; G09G 5/391; G06F 3/048; G06F 3/013; G06F 3/1423; G06F 3/14; G06F 1/3231; G06F 1/3265; G06F 3/016; G06F 3/04817; G06F 3/0484; G06F 3/04845; G06F 3/04847; G06F 3/147; G01C 21/26; G01C 21/3484; G01C 21/3605; G01C 21/3617; G01C 21/3602; G01C 22/00; G05D 1/0061; G05D 1/0088; G05D 1/0223; G05D 1/0257; G05D 2201/0213; H04N 7/183; H04N 7/18; H04N 7/181; H04N 5/2253; H04N 5/2628; H04N 5/23293; H04N 5/2624; H04N 5/272; H04N 9/3141; B60T 7/12; G01S 19/13; G01S 19/39; G01S 19/48; G01S 11/12; G06T 2207/30264; G06T 3/4038; G06T 3/60; G06T 7/70; G06T 11/00; G06T 19/00; G06T 1/00; G06T 2207/30196; G06T 2207/30268; G06T 3/40; G06T 7/246; G06T 7/73; G09B 29/10; B60D 1/245; B60D 1/62; B60J 1/00; B60Q 9/005; G01B 11/26; G01B 7/30; G01P 3/38; G02B 2027/014; G02B 2027/0141; G02B 27/01; G02B 27/0101; G03B 21/2013; G03B 33/08; G09F 9/301
USPC ......... 340/932.2, 995.1, 438, 441, 436, 461, 340/995.17, 995.26, 995.27
See application file for complete search history.

(56) References Cited

U.S. PATENT DOCUMENTS

| | | | | |
|---|---|---|---|---|
| 10,628,020 | B2* | 4/2020 | Fujita | G09G 3/001 |
| 2007/0274102 | A1* | 11/2007 | Bohme | G02B 27/0101 |
| | | | | 362/616 |
| 2011/0063444 | A1* | 3/2011 | Okamoto | B60R 1/00 |
| | | | | 348/148 |
| 2012/0327238 | A1* | 12/2012 | Satoh | G08G 1/167 |
| | | | | 348/148 |
| 2013/0050490 | A1* | 2/2013 | Kato | G06T 3/0062 |
| | | | | 348/148 |
| 2017/0291550 | A1* | 10/2017 | Sasaguchi | B60R 1/00 |
| 2018/0074497 | A1* | 3/2018 | Tsuji | G08G 1/096888 |
| 2018/0308358 | A1* | 10/2018 | Hayakawa | G01C 21/26 |
| 2019/0001968 | A1* | 1/2019 | Yorifuji | B60K 35/00 |
| 2019/0308501 | A1* | 10/2019 | Saka | G06F 1/3231 |

* cited by examiner

DISPLAY CONTROLLER

CROSS REFERENCE TO RELATED APPLICATIONS

This application is based on and claims priority under 35 U.S.C. § 119 to Japanese Patent Application 2019-014544, filed on Jan. 30, 2019, the entire contents of which are incorporated herein by reference.

TECHNICAL FIELD

This disclosure relates to a display controller.

BACKGROUND DISCUSSION

In the related art, a technique of visually notifying an occupant of a vehicle of a situation around the vehicle by using image data as a result of capturing an image with an image capturing unit that captures an image of the situation around the vehicle is diversely studied.

Examples of the related art include JP 2010-264953A (Reference 1) and JP 2015-74260A (Reference 2).

In the above-described technique in the related art, it is desirable to notify the occupant of the control state of the vehicle, for example, whether or not the vehicle is operated only by a manual driving operation performed by a driver, or whether or not the vehicle operates under proxy control where at least a part of the manual driving operation is systematically performed by proxy for the driver, together with the situation around the vehicle, in a more easily recognizable manner.

Thus, a need exists for a display controller which is not susceptible to the drawback mentioned above.

SUMMARY

A display controller as an example of this disclosure includes an image data acquisition unit that acquires image data as a result of capturing an image with an image capturing unit which captures an image of a situation around a vehicle; and a display processing unit that displays a display screen which includes a first region displaying a surrounding image that is generated based on the image data and indicates the situation around the vehicle and a second region other than the first region on a display unit, and changes a display mode of at least a part of at least one of the first region and the second region on the display screen depending on whether or not proxy control is executed to perform at least a part of a driving operation of the vehicle by proxy for a driver.

A display controller as another example of this disclosure includes an image data acquisition unit that acquires image data as a result of capturing an image with an image capturing unit which captures an image of a situation around a vehicle; and a display processing unit that displays a display screen which includes a first region where a surrounding image based on the image data is displayed and a second region other than the first region, on a display unit, and changes a display mode of at least a part of at least one of the first region and the second region on the display screen depending on a change in the vehicle and the situation around the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment and modification examples disclosed here will be described with reference to the drawings. The configurations of the embodiment and the modification examples and the actions and results (effects) resulting from the configurations which will be described hereinafter are merely examples, and are not limited to the following descriptions.

Embodiment

Figure 1:
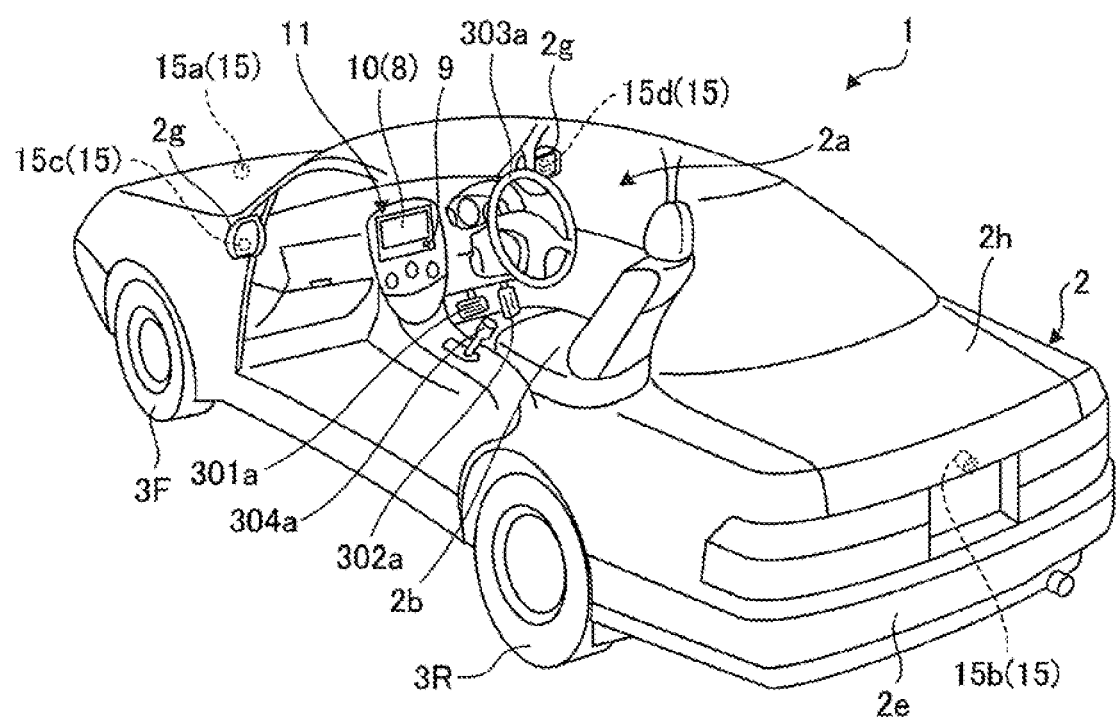
FIG. 1 is an exemplary and schematic view showing the configuration of a passenger compartment of a vehicle according to an embodiment.
Figure 2:
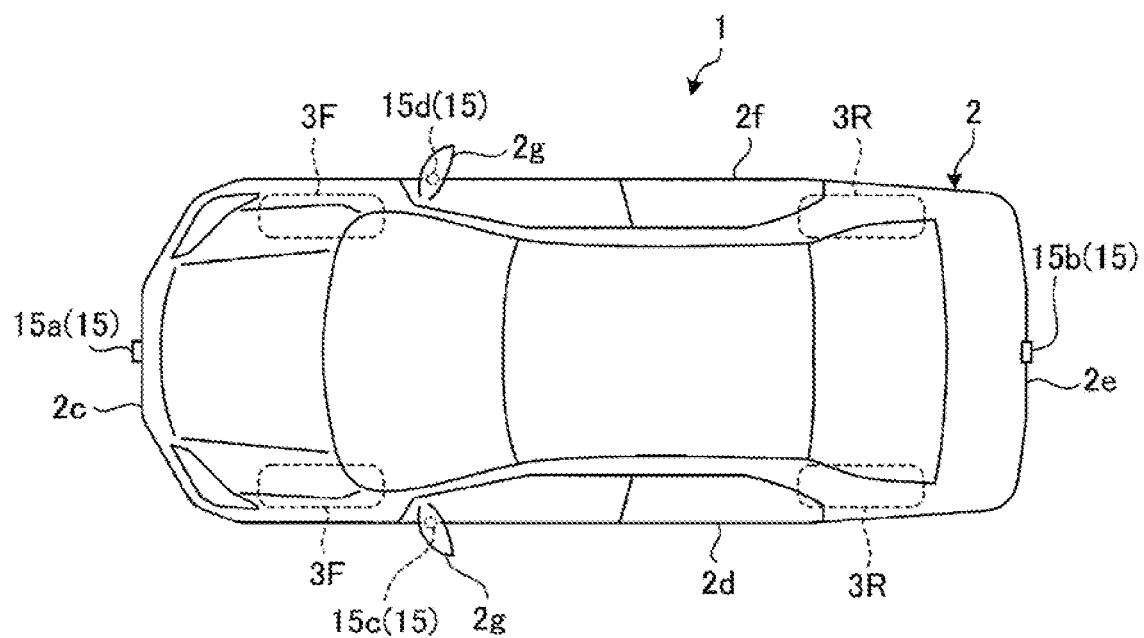
FIG. 2 is an exemplary and schematic view showing the exterior of the vehicle according to the embodiment as seen from above.

Firstly, a schematic configuration of a vehicle 1 according to an embodiment will be described with reference to FIGS. 1 and 2. FIG. 1 is an exemplary and schematic view showing the configuration of a passenger compartment 2a of the vehicle 1 according to the embodiment. FIG. 2 is an exemplary and schematic view showing the exterior of the vehicle 1 according to the embodiment as seen from above.

As shown in FIG. 1, the vehicle 1 according to the embodiment includes the passenger compartment 2a into which occupants including a driver as a user get. A brake unit (brake operation unit) 301a, an acceleration unit (acceleration operation unit) 302a, a steering unit 303a, a gear shift unit (gear shift operation unit) 304a, and the like are provided in the passenger compartment 2a in a state where these units can be operated from a seat 2b by the user.

The brake unit 301a is, for example, a brake pedal that is provided under the feet of the driver. The acceleration unit 302a is, for example, an accelerator pedal that is provided under the feet of the driver. In addition, the steering unit 303a is, for example, a steering wheel that protrudes from a dashboard (instrument panel). The gear shift unit 304a is, for example, a shift lever that protrudes from a center console. Incidentally, the steering unit 303a may be a wheel.

A monitor device 11 is provided in the passenger compartment 2a, and includes a display unit 8 that can output various images, and a voice output unit 9 that can output various voices. The monitor device 11 is provided, for example, in a central portion of the dashboard in the passenger compartment 2a in a width direction (rightward and leftward direction). Incidentally, the display unit 8 is, for example, a liquid crystal display (LCD), an organic electroluminescence display (OELD), or the like.

Here, an operation input unit 10 is provided on a display screen which is a region of the display unit 8 in which an image is displayed. The operation input unit 10 is a touch panel that can detect the coordinates of a position that is very close (including contact) to an indicator such as the finger or a stylus. Therefore, the user (driver) can see an image that is displayed on the display screen of the display unit 8, and can execute various input operations by performing a touch (tap) operation or the like using the indicator on the operation input unit 10.

Incidentally, in the embodiment, the operation input unit 10 may be various physical interfaces such as a switch, a dial, a joystick, and a push button. In addition, in the embodiment, another voice output device may be provided in the passenger compartment 2a at a position that is different from the position of the monitor device 11. In this case, various voice information can be output from both of the voice output unit 9 and the other voice output device. In addition, in the embodiment, the monitor device 11 may be configured to be able to display information relating to various systems such as a navigation system and an audio system.

In addition, as shown in FIGS. 1 and 2, the vehicle 1 according to the embodiment is a four-wheel automobile with right and left two front vehicle wheels 3F and right and left two rear vehicle wheels 3R. Hereinafter, for the purpose of simplification, the front vehicle wheels 3F and the rear vehicle wheels 3R may be collectively referred to as vehicle wheels. In the embodiment, the sideslip angle of a part or the entirety of the four vehicle wheels changes (steers) depending on the operation of the steering unit 303a or the like.

In addition, a plurality of (four in the example shown in FIGS. 1 and 2) in-vehicle cameras 15a to 15d which are image capturing units for monitoring surroundings are installed in the vehicle 1. The in-vehicle camera 15b is provided in a rear end portion 2e (for example, below a rear trunk door 2h) of a vehicle body 2 to capture an image of a region behind the vehicle 1. In addition, the in-vehicle camera 15d is provided in a side-view mirror 2g of a right end portion 2f of the vehicle body 2 to capture an image of a region on a right side of the vehicle 1. In addition, the in-vehicle camera 15a is provided in a front end portion 2c (for example, a front bumper) of the vehicle body 2 to capture an image of a region in front of the vehicle 1. In addition, the in-vehicle camera 15c is provided in the side-view mirror 2g of a left end portion 2d of the vehicle body 2 to capture an image of a region on a left side of the vehicle 1. Hereinafter, for the purpose of simplification, the in-vehicle cameras 15a to 15d may be collectively referred to as an in-vehicle camera 15.

The in-vehicle camera 15 is a so-called digital camera with an image sensor such as a charge-coupled device (CCD) or a complementary metal oxide semiconductor (CMOS) image sensor (CIS). The in-vehicle camera 15 captures images of the surroundings of the vehicle 1 at a predetermined frame rate, and outputs image data of the captured images obtained by the image capturing operation. The image data obtained by the in-vehicle camera 15 can form a moving image as a frame image.

Subsequently, a system configuration which is provided to realize various control in the vehicle 1 according to the embodiment will be described with reference to FIG. 3. Incidentally, the system configuration shown in FIG. 3 is merely an example, and can be set (changed) in various forms.

Figure 3:
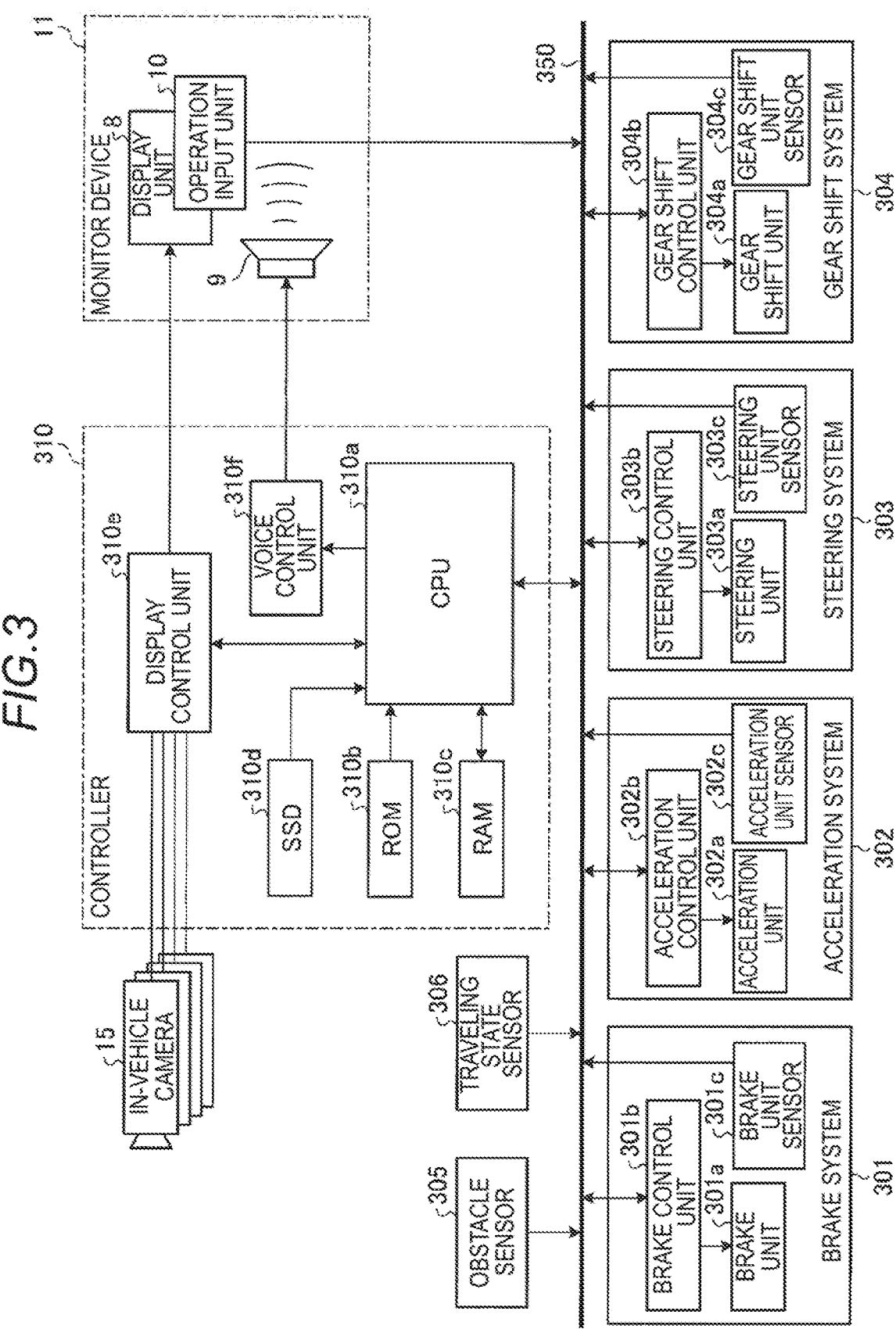
FIG. 3 is an exemplary and schematic block diagram showing the system configuration of the vehicle according to the embodiment.

FIG. 3 is an exemplary and schematic block diagram showing the system configuration of the vehicle 1 according to the embodiment. As shown in FIG. 3, the vehicle 1 according to the embodiment includes a brake system 301; an acceleration system 302; a steering system 303; a gear shift system 304; an obstacle sensor 305; a traveling state sensor 306; the in-vehicle camera 15; the monitor device 11; a controller 310; and an in-vehicle network 350.

The brake system 301 controls the deceleration of the vehicle 1. The brake system 301 includes the brake unit 301a, a brake control unit 301b, and a brake unit sensor 301c.

The brake unit 301a is a device such as the above-described brake pedal for decelerating the vehicle 1.

The brake control unit 301b is a microcomputer with a hardware processor such as a central processing unit (CPU). The brake control unit 301b controls the degree of deceleration of the vehicle 1, for example, by driving an actuator (not shown) to operate the brake unit 301a based on an instruction which is input via the in-vehicle network 350.

The brake unit sensor 301c is a sensing device for detecting the state of the brake unit 301a. For example, in a case where the brake unit 301a is a brake pedal, the brake unit sensor 301c detects the position of the brake pedal or a pressure applied to the brake pedal as the state of the brake unit 301a. The brake unit sensor 301c outputs the detected state of the brake unit 301a to the in-vehicle network 350.

The acceleration system 302 controls the acceleration of the vehicle 1. The acceleration system 302 includes the acceleration unit 302a, an acceleration control unit 302b, and an acceleration unit sensor 302c.

The acceleration unit 302a is a device such as the above-described accelerator pedal for accelerating the vehicle 1.

The acceleration control unit 302b is a microcomputer with a hardware processor such as a CPU. The acceleration control unit 302b controls the degree of acceleration of the vehicle 1, for example, by driving an actuator (not shown) to operate the acceleration unit 302a based on an instruction which is input via the in-vehicle network 350.

The acceleration unit sensor 302c is a sensing device for detecting the state of the acceleration unit 302a. For example, in a case where the acceleration unit 302a is an accelerator pedal, the acceleration unit sensor 302c detects the position of the accelerator pedal or a pressure applied to the accelerator pedal. The acceleration unit sensor 302c outputs the detected state of the acceleration unit 302a to the in-vehicle network 350.

The steering system 303 controls the advance direction of the vehicle 1. The steering system 303 includes the steering unit 303a, a steering control unit 303b, and a steering unit sensor 303c.

The steering unit 303a is a device such as the steering wheel or the wheel described above for steering steered wheels of the vehicle 1.

The steering control unit 303b is a microcomputer with a hardware processor such as a CPU. The steering control unit 303b controls the advance direction of the vehicle 1, for example, by driving an actuator (not shown) to operate the steering unit 303a based on an instruction which is input via the in-vehicle network 350.

The steering unit sensor 303c is a sensing device for detecting the state of the steering unit 303a, namely, is a steering angle sensor for detecting the steering angle of the vehicle 1. For example, in a case where the steering unit 303a is a steering wheel, the steering unit sensor 303c detects the position of the steering wheel or the rotational angle of the steering wheel. Incidentally, in a case where the steering unit 303a is a wheel, the steering unit sensor 303c may detect the position of the wheel or a pressure applied to the wheel. The steering unit sensor 303c outputs the detected state of the steering unit 303a to the in-vehicle network 350.

The gear shift system 304 controls the gear ratio of the vehicle 1. The gear shift system 304 includes the gear shift unit 304a, a gear shift control unit 304b, and a gear shift unit sensor 304c.

The gear shift unit 304a is a device such as the above-described shift lever for changing the gear ratio of the vehicle 1.

The gear shift control unit 304b is a computer with a hardware processor such as a CPU. The gear shift control unit 304b controls the gear ratio of the vehicle 1 by driving an actuator (not shown) to operate the gear shift unit 304a based on an instruction which is input via the in-vehicle network 350.

The gear shift unit sensor 304c is a sensing device for detecting the state of the gear shift unit 304a. For example, in a case where the gear shift unit 304a is a shift lever, the gear shift unit sensor 304c detects the position of the shift lever or a pressure applied to the shift lever. The gear shift unit sensor 304c outputs the detected state of the gear shift unit 304a to the in-vehicle network 350.

The obstacle sensor 305 is a sensing device for detecting information relating to an object (obstacle) that may exist around the vehicle 1. The obstacle sensor 305 includes, for example, a ranging sensor that acquires a distance to an object which exists around the vehicle 1. Examples of the ranging sensor include a sonar that acquires a distance to an object by transmitting sound waves and receiving sound waves reflected by the object which exists around the vehicle 1, and a laser radar that acquires a distance to an object by transmitting radio waves such as light and receiving radio waves reflected by an object which exists around the vehicle 1. The obstacle sensor 305 outputs the detected information to the in-vehicle network 350.

The traveling state sensor 306 is a device for detecting the traveling state of the vehicle 1. The traveling state sensor 306 includes a vehicle wheel sensor that detects the vehicle wheel speed of the vehicle 1, an acceleration sensor that detects the acceleration of the vehicle 1 in a forward and rearward direction or a rightward and leftward direction, a gyro sensor that detects the turning speed (angular speed) of the vehicle 1, or the like. The traveling state sensor 306 outputs the detected traveling state to the in-vehicle network 350.

The controller 310 is a device that integrally controls various systems provided in the vehicle 1. The controller 310 according to the embodiment has a function of generating a surrounding image indicating the situation around the vehicle 1 based on the image data as a result of capturing an image with the in-vehicle camera 15, and displaying the generated surrounding image on the display unit 8, which will be described in detail later. Incidentally, the surrounding image referred to here includes an overlook image of the situation (also including the vehicle 1 itself) around the vehicle 1 as seen in the overlook view from above, a three-dimensional image of the situation (also including the vehicle 1 itself) around the vehicle 1 as seen three-dimensionally from a random viewpoint, a single camera image which is an image based on only one image data that is acquired from one in-vehicle camera 15, or the like.

The controller 310 is an electronic control unit (ECU) including a central processing unit (CPU) 310a, a read only memory (ROM) 310b, a random access memory (RAM) 310c, a solid state drive (SSD) 310d, a display control unit 310e, and a voice control unit 310f.

The CPU 310a is a hardware processor that integrally controls the controller 310. The CPU 310a reads various control programs (computer programs) stored in the ROM 310b or the like, and realizes various functions according to instructions that are specified by the various control programs. Incidentally, the various control programs referred to here include a display control program for realizing a display control process of displaying the above-described surrounding image, an actual vehicle image, and a virtual vehicle image.

The ROM 310b is a non-volatile main storage device that stores parameters and the like required to execute the above-described various control programs.

The RAM 310c is a volatile main storage device that provides a working region for the CPU 310a.

The SSD 310d is a non-volatile rewritable auxiliary storage device. Incidentally, the controller 310 according to the embodiment may be provided with a hard disk drive (HDD) as an auxiliary storage device instead of the SSD 310*d* (or, in addition to the SSD 310*d*).

The display control unit 310*e* is mainly in charge of performing an image process on the captured images obtained from the in-vehicle camera 15, generating image data to be output to the display unit 8 of the monitor device 11, and the like among various processes that can be executed by the controller 310.

The voice control unit 310*f* is mainly in charge of generating voice data to be output to the voice output unit 9 of the monitor device 11 among the various processes that can be executed by the controller 310.

The brake system 301, the acceleration system 302, the steering system 303, the gear shift system 304, the obstacle sensor 305, the traveling state sensor 306, the operation input unit 10 of the monitor device 11, and the controller 310 are connected together via the in-vehicle network 350 to be able to communicate with each other.

By the way, in the related art, the technique of notifying the occupant of the situation around the vehicle 1 by using a surrounding image as described above is diversely studied. In this technique, it is desirable to notify the occupant of the control state of the vehicle 1, for example, whether or not the vehicle 1 is operated only by a manual driving operation performed by the driver, or whether or not the vehicle 1 operates under proxy control where at least a part of the manual driving operation is systematically performed by proxy for the driver, together with the situation around the vehicle 1, in a more easily recognizable manner.

Figure 4:
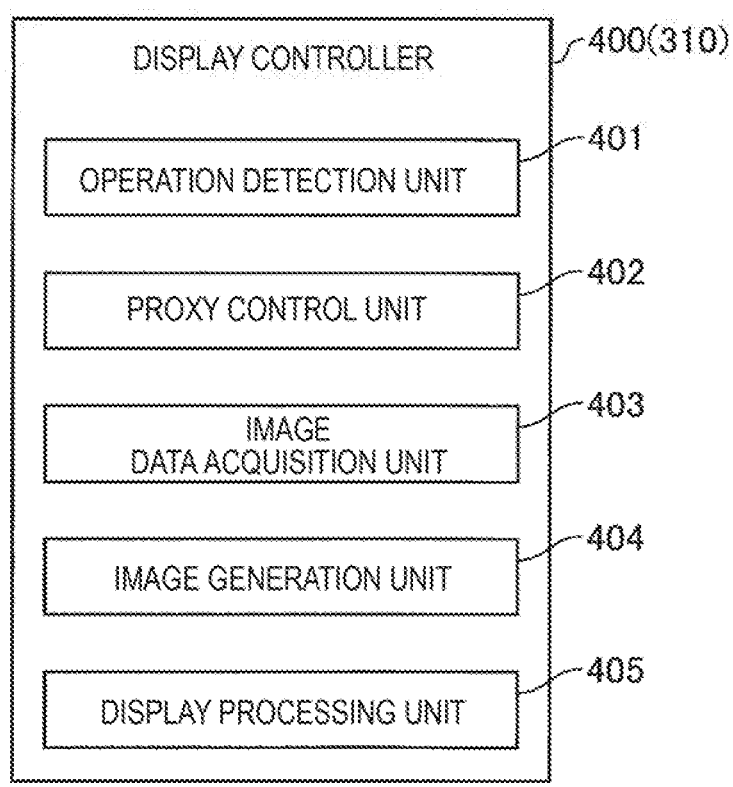
FIG. 4 is an exemplary and schematic block diagram showing the function of a display controller according to the embodiment.

Accordingly, in the embodiment, the notification of the control state of the vehicle 1 together with the situation around the vehicle 1 to the occupant in a more easily recognizable manner is realized by realizing the display controller 400 having the following functions shown in FIG. 4 in the controller 310.

FIG. 4 is an exemplary and schematic block diagram showing the function of the display controller 400 according to the embodiment. The functions shown in FIG. 4 are realized in the controller 310 by cooperation between software and hardware. Namely, the CPU 310*a* of the controller 310 reads a predetermined control program (camera parameter estimation program) stored in the ROM 310*b* or the like and executes the predetermined control program to realize the functions shown in FIG. 4. Incidentally, in the embodiment, at least a part of the functions shown in FIG. 4 may be realized by dedicated hardware (circuit).

As shown in FIG. 4, the display controller 400 according to the embodiment includes an operation detection unit 401; a proxy control unit 402; an image data acquisition unit 403; an image generation unit 404; and a display processing unit 405.

The operation detection unit 401 detects various operations that are executed on the vehicle 1. For example, the operation detection unit 401 detects an operation (touch operation or the like) that is input via the operation input unit 10 of the monitor device 11.

The proxy control unit 402 executes proxy control to perform at least a part of the driving operation of the vehicle 1 by proxy for the driver by properly controlling the brake system 301, the acceleration system 302, the steering system 303, and the gear shift system 304 which are described above. The proxy control can realize, for example, the automatic (or semiautomatic) movement of the vehicle 1 to a target position without depending only on a driving operation performed by the driver. Incidentally, automatic parking and the like are examples of the proxy control. A parking position which the vehicle 1 finally reaches and a turning position which may exist before the vehicle 1 reaches the parking position can be considered as target positions that can be set in the automatic parking. In the embodiment, the proxy control unit 402 may be realized in a dedicated ECU that is provided separately from the controller 310 forming the display controller 400 to integrally manage the control of the traveling of the vehicle 1 and the like. Incidentally, there is no need to say that the technique of the embodiment can be also applied to proxy controls other than the automatic parking.

The image data acquisition unit 403 acquires image data from the in-vehicle camera 15 as a result of capturing an image with the in-vehicle camera 15.

The image generation unit 404 generates an image to be displayed on the display unit 8 of the monitor device 11 based on the image data acquired by the image data acquisition unit 403 and the like.

The display processing unit 405 controls display content for the display unit 8 of the monitor device 11 based on the image generated by the image generation unit 404. More specifically, the display processing unit 405 displays a display screen including a first region where the surrounding image indicating the situation around the vehicle 1 is displayed and a second region other than the first region on the display unit 8 (A specific example will be described later).

Here, in the embodiment, the display processing unit 405 properly changes a display mode of at least a part of at least one of the first region and the second region on the above-described display screen depending on whether or not the proxy control is executed by the proxy control unit 402. Incidentally, in the embodiment, there will be mainly described an example where the display mode of the first region is not changed and the display mode of the second region (substantially the entirety of the second region) is changed.

Hereinafter, one example of the transition of a display screen in a case where the control state of the vehicle 1 is switched from manual driving where the vehicle 1 is operated only by a manual driving operation performed by the driver to the automatic parking by the proxy control will be described with reference to FIGS. 5 to 9. The above-described switching of the control state is executed depending on an operation performed by the driver.

Figure 5:
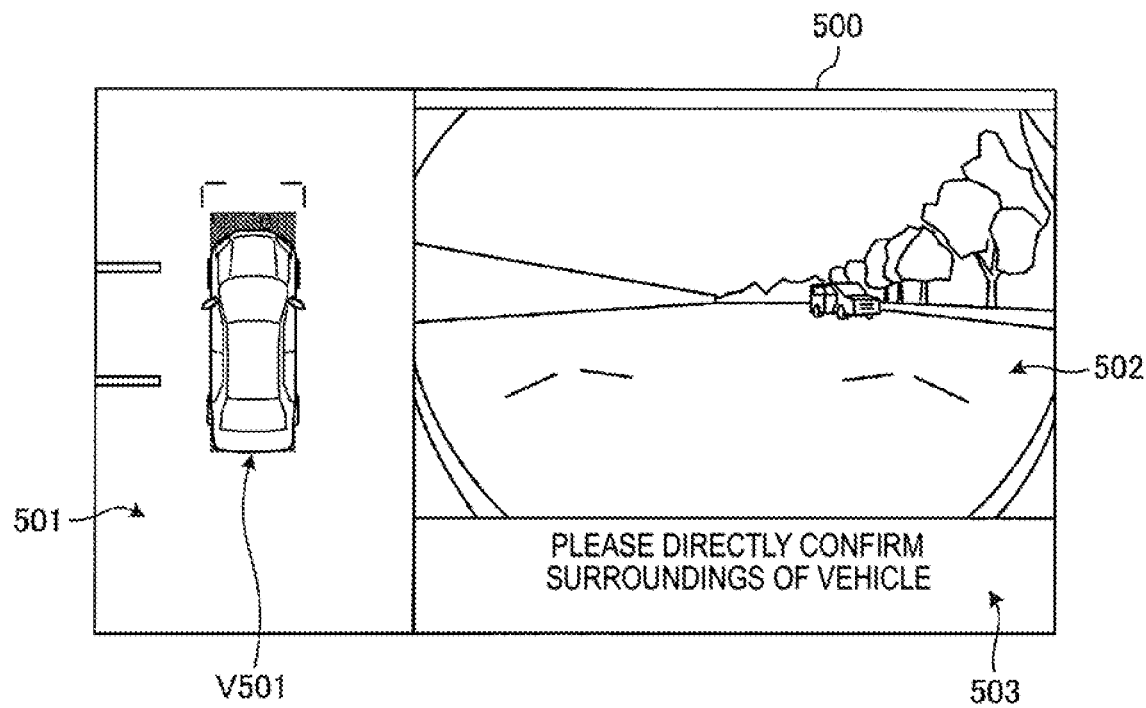
FIG. 5 is an exemplary and schematic view showing one example of a display screen before automatic parking starts in the embodiment.

FIG. 5 is an exemplary and schematic view showing one example of a display screen before the automatic parking starts in the embodiment. As shown in FIG. 5, when the vehicle 1 operates in a manual driving mode before the automatic parking starts, the display processing unit 405 can display an image 500 as a display screen on the display unit 8, and the image 500 contains images 501 and 502 showing an overlook image and a single camera image of a region in front of the vehicle 1, and an image 503 containing only a message to prompt the direct confirmation of the surroundings of the vehicle (namely, not containing a surrounding image). A vehicle image V501 indicating the state (the shape, position, or the like) of the vehicle 1 in the viewpoint of the image 501 is displayed in the image 501 showing an overlook image.

In the example shown in FIG. 5, regions where the images 501 and 502 are displayed in the image 500 correspond to the first region where surrounding images are displayed, and a region where the image 503 is displayed in the image 500 corresponds to the second region where a background image other than a surrounding image is displayed. Therefore, when the control state of the vehicle 1 is switched to the automatic parking in a state where the display screen such as the image 500 shown in FIG. 5 is displayed on the display unit 8, the display processing unit 405 changes the display mode of the image 503 in the second region, and displays a display screen such as an image 600 shown in FIG. 6 on the display unit 8 as below. Incidentally, in the embodiment, a change in the display mode of the second region is realized as a change in at least the color or pattern of the second region.

Figure 6:
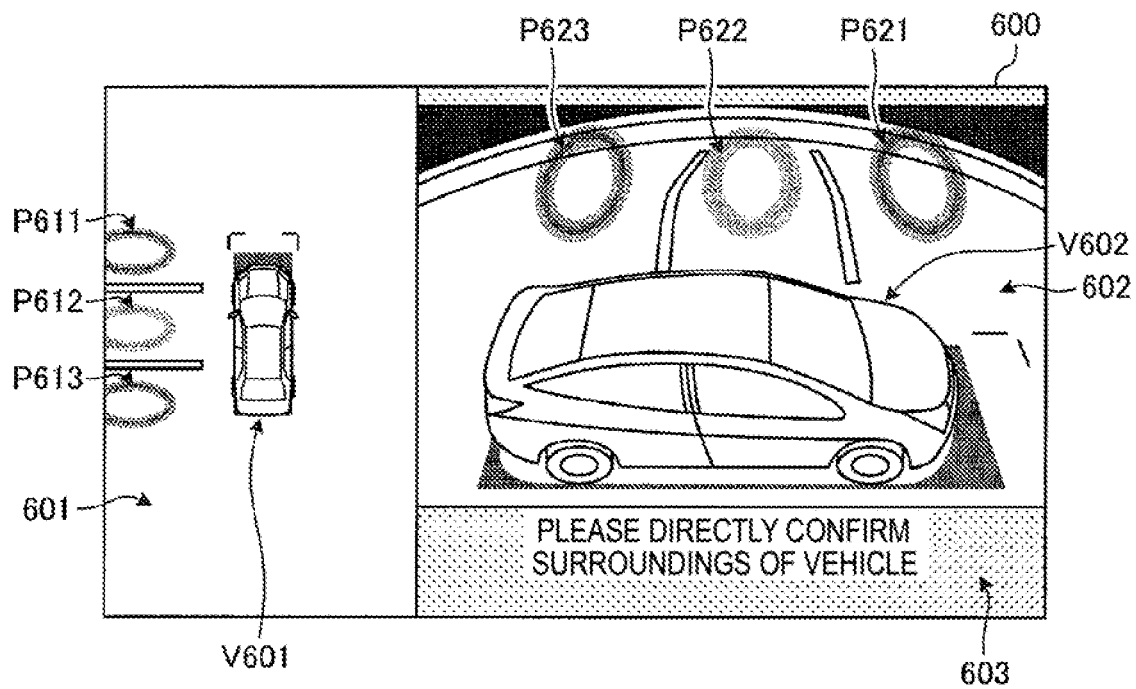
FIG. 6 is an exemplary and schematic view showing one example of a display screen when the automatic parking starts in the embodiment.

FIG. 6 is an exemplary and schematic view showing one example of a display screen when the automatic parking starts in the embodiment. Except that one of the surrounding images is switched from a single camera image to a three-dimensional image, the screen configuration (screen layout) of the image 600 shown in FIG. 6 is basically the same as the screen layout of the image 500 shown in FIG. 5. Namely, in the image 600 shown in FIG. 6, images 601 and 602 showing an overlook image and a three-dimensional image are displayed in a region corresponding to the first region where the surrounding images are displayed, and an image 603 containing only a message to prompt the direct confirmation of the surroundings of the vehicle (namely, not containing a surrounding image) is displayed in a region corresponding to the second region where a background image other than a surrounding image is displayed.

However, in the embodiment, as described above, the color and/or the pattern of the second region is properly changed depending on whether or not the automatic parking is executed. Therefore, in the embodiment, as the control state of the vehicle 1 is switched to the automatic parking, in the example shown in FIG. 6, the color and/or the pattern of the image 603 displayed in the region corresponding to the second region is changed to a color and/or a pattern that are different from the color and/or the pattern of the image 503 displayed in the region corresponding to the second region in the example shown in FIG. 5.

Incidentally, in the example shown in FIG. 6, a vehicle image V601 indicating the state of the vehicle 1 in the viewpoint of the image 601 and a plurality of icons P611 to P613 indicating a plurality of candidates for a target position which the vehicle 1 finally has to reach in the viewpoint of the image 601 are displayed in the image 601 showing an overlook image. A vehicle image V602 indicating the state of the vehicle 1 in the viewpoint of the image 602 and a plurality of icons P621 to P623 indicating a plurality of candidates for a target position which the vehicle 1 finally has to reach in the viewpoint of the image 602 are also displayed in the image 602 showing a three-dimensional image.

When one of the plurality of candidates for the target position is selected depending on an operation performed by the driver in a state where the display screen such as the image 600 shown in FIG. 6 is displayed, the vehicle 1 starts moving in an automatic parking mode where the selected candidate is the target position, and the display processing unit 405 displays a display screen such as an image 700 shown in FIG. 7 on the display unit 8 as below.

Figure 7:
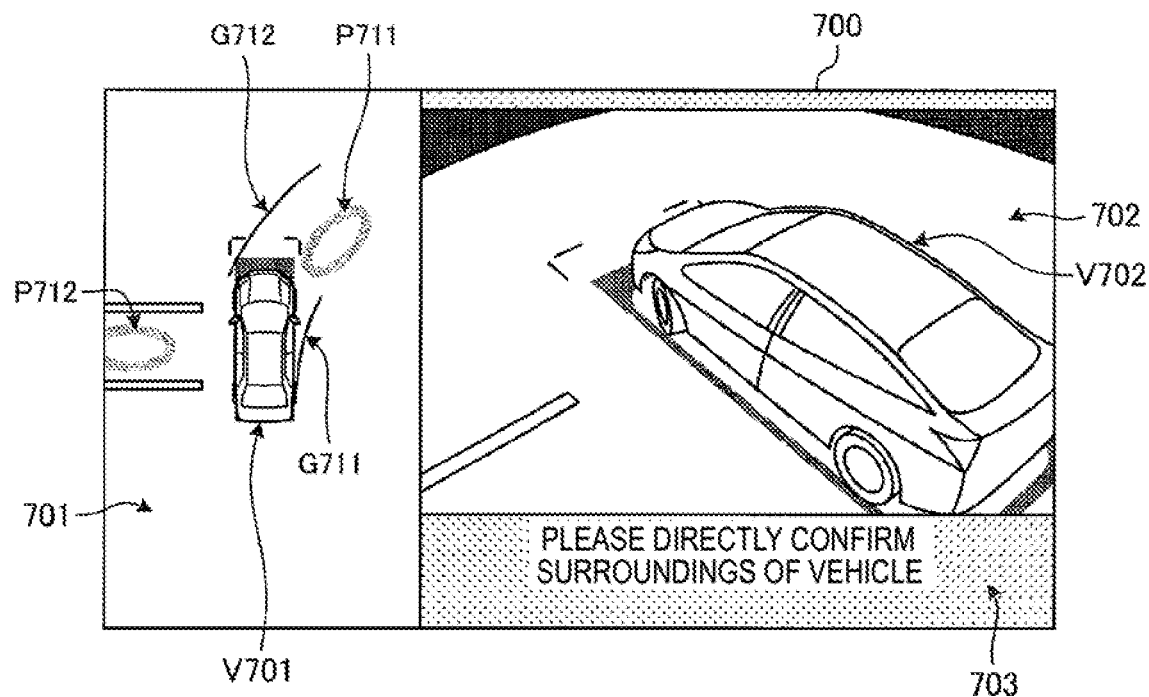
FIG. 7 is an exemplary and schematic view showing one example of a display screen when the vehicle is moving in an automatic parking mode in the embodiment.

FIG. 7 is an exemplary and schematic view showing one example of a display screen when the vehicle 1 is moving in the automatic parking mode in the embodiment. The screen layout of the image 700 shown in FIG. 7 is basically the same as the screen layout of the image 600 shown in FIG. 6. Namely, also in the image 700 shown in FIG. 7, similar to the image 600 shown in FIG. 6, images 701 and 702 showing an overlook image and a three-dimensional image are displayed in a region corresponding to the first region where surrounding images are displayed, and an image 703 containing only a message to prompt the direct confirmation of the surroundings of the vehicle (namely, not containing a surrounding image) is displayed in a region corresponding to the second region where a background image other than a surrounding image is displayed.

Here, in the example shown in FIG. 7, similar to the example shown in FIG. 6, the control state of the vehicle 1 continues to be in the automatic parking mode. Therefore, in the example shown in FIG. 7, the color and/or the pattern of the image 703 displayed in the region corresponding to the second region is the same as the color and/or the pattern of the image 603 displayed in the region corresponding to the second region in the example shown in FIG. 6.

Incidentally, in the example shown in FIG. 7, a vehicle image V701 indicating the state of the vehicle 1 in the viewpoint of the image 701, icons P711 and P712 indicating a turning position and a parking position as target positions which the vehicle 1 finally has to reach in the viewpoint of the image 701, and guide lines G711 and G712 as guide displays which are guides to the travel path of the vehicle 1 are displayed in the image 701 showing an overlook image. A vehicle image V702 indicating the state of the vehicle 1 in the viewpoint of the image 702 is displayed in the image 702 showing a three-dimensional image. Incidentally, the same guide displays as the guide lines G711 and G712 may be displayed in the image 702 showing a three-dimensional image. In the embodiment, also the display mode of the guide lines G711 and G712 when the vehicle 1 is moving in the automatic parking mode is one of the features, and this display mode will not be further described here, but will be described later.

The display mode of the display screen as in the example shown in FIG. 7 basically continues to be displayed until the vehicle 1 proceeds to move in the automatic parking mode and the automatic parking ends as the vehicle 1 stops at the parking position. Then, the display processing unit 405 displays a display screen such as an image 800 shown in FIG. 8 on the display unit 8 as below when the automatic parking ends, more specifically, in a time period from when the stopping of the vehicle 1 at the parking position ends to when the automatic parking ends.

Figure 8:
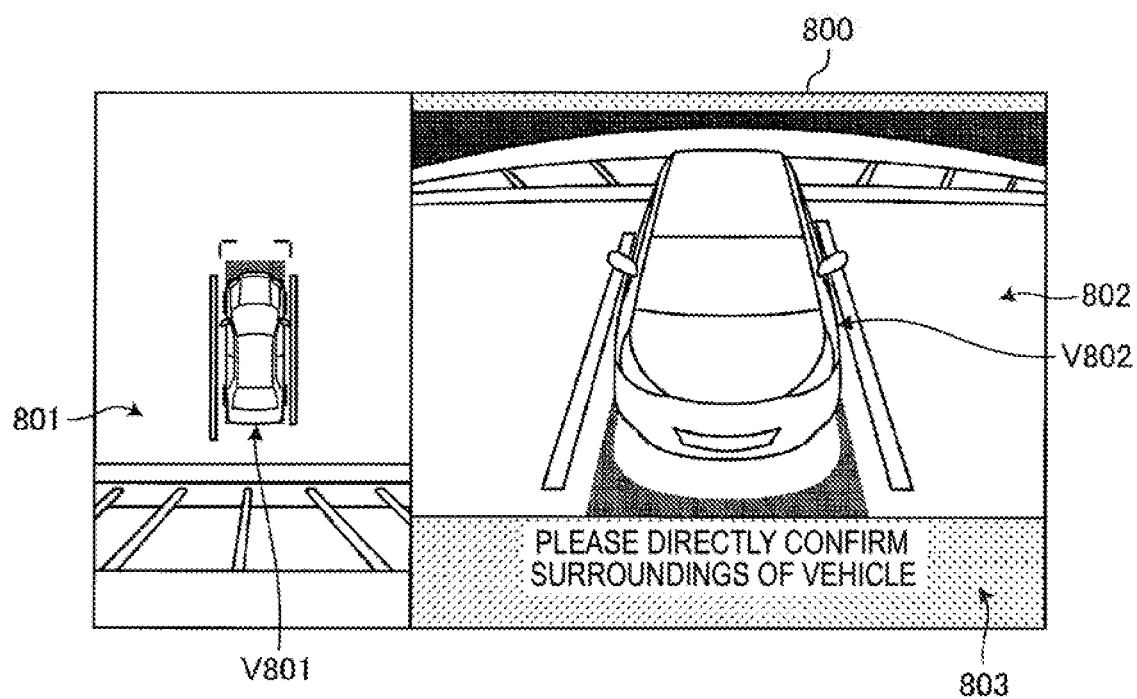
FIG. 8 is an exemplary and schematic view showing one example of a display screen when the automatic parking ends in the embodiment.

FIG. 8 is an exemplary and schematic view showing one example of a display screen when the automatic parking ends in the embodiment. The screen layout of the image 800 shown in FIG. 8 is basically the same as the screen layout of the image 700 shown in FIG. 7. Namely, in the image 800 shown in FIG. 8, similar to the image 700 shown in FIG. 7, images 801 and 802 showing an overlook image and a three-dimensional image are displayed in a region corresponding to the first region where surrounding images are displayed, and an image 803 containing only a message to prompt the direct confirmation of the surroundings of the vehicle (namely, not containing a surrounding image) is displayed in a region corresponding to the second region where a background image other than a surrounding image is displayed. Incidentally, a vehicle image V801 indicating the state of the vehicle 1 in the viewpoint of the image 801 is displayed in the image 801 showing an overlook image, and a vehicle image V802 indicating the state of the vehicle 1 in the viewpoint of the image 802 is displayed in the image 802 showing a three-dimensional image.

Here, as described above, the example shown in FIG. 8 corresponds to when the automatic parking ends, more specifically, to the time period from when the stopping of the vehicle 1 at the parking position ends to when the automatic parking ends. Therefore, in the example shown in FIG. 8, since it can be said that the automatic parking is still executed, the color and/or the pattern of the image 803 displayed in the region corresponding to the second region is the same as the color and/or the pattern of the image 703 displayed in the region corresponding to the second region in the example shown in FIG. 7.

Here, in the embodiment, as described above, the color and/or the pattern of the second region is changed depending on whether or not the automatic parking is executed. Therefore, in the embodiment, when the control state of the vehicle 1 is switched to manual driving in a state where the display screen such as the image 800 shown in FIG. 8 is displayed on the display unit 8, the display processing unit 405 changes the display mode of the image 803 in the second region, and displays a display screen such as an image 900 shown in FIG. 9 on the display unit 8 as below.

Figure 9:
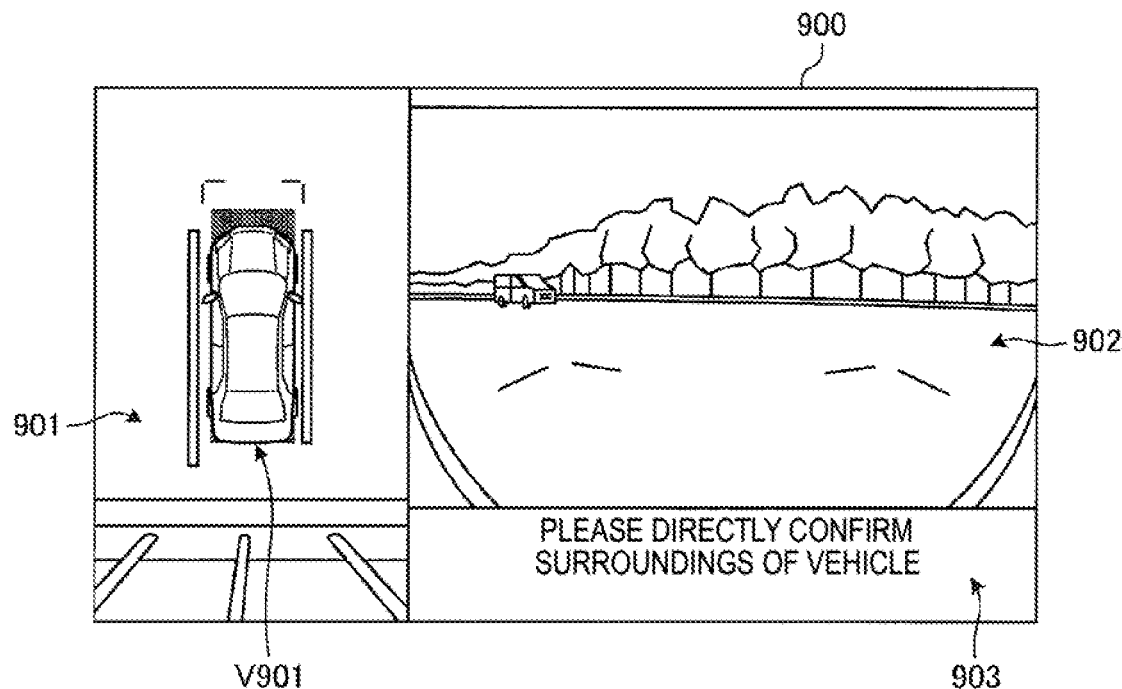
FIG. 9 is an exemplary and schematic view showing one example of a display screen after the automatic parking ends in the embodiment.

FIG. 9 is an exemplary and schematic view showing one example of a display screen after the automatic parking ends in the embodiment. Except that one of the surrounding images is switched from a three-dimensional image to a single camera image of a region in front of the vehicle 1, the screen layout of the image 900 shown in FIG. 9 is substantially the same as the screen layout of the image 800 shown in FIG. 8. Namely, in the image 900 shown in FIG. 9, images 901 and 902 showing an overlook image and a single camera image of the region in front of the vehicle 1 are displayed in a region corresponding to the first region where surrounding images are displayed, and an image 903 containing only a message to prompt the direct confirmation of the surroundings of the vehicle (namely, not containing a surrounding image) is displayed in a region corresponding to the second region where a background image other than a surrounding image is displayed. Incidentally, a vehicle image V901 indicating the state of the vehicle 1 in the viewpoint of the image 901 is displayed in the image 901 showing an overlook image.

Here, as described above, the example shown in FIG. 9 corresponds to after the automatic parking ends, more specifically, to after the control state of the vehicle 1 returns to the manual driving from the automatic parking again. Therefore, in the example shown in FIG. 9, the color and/or the pattern of the image 903 displayed in the region corresponding to the second region is changed to a color and/or a pattern that are different from the color and/or the pattern of the image 803 displayed in the region corresponding to the second region in the example shown in FIG. 8, namely, to the same color and/or the same pattern as the color and/or the pattern of the image 503 displayed in the region corresponding to the second region in the example shown in FIG. 5.

As described above, according to the embodiment, the display mode of the second region showing the background image other than the surrounding image on the display screen is properly changed depending on the control state of the vehicle 1; and thereby, it is possible to notify the occupant of the control state of the vehicle 1 by using the basic screen layout as it is, for example, without adding a new dedicated display or the like for notifying the occupant of the control state of the vehicle 1 to the display screen.

Incidentally, in the embodiment, in order to more powerfully notify the occupant of a change in the control state of the vehicle 1, the display processing unit 405 can further change the display mode of at least a part of at least one of the first region and the second region in a transition period between a state where the proxy control is executed and a state where the proxy control is not executed. For example, in a case where the display screen transitions from that in the example shown in FIG. 5 to that in the example shown in FIG. 6, or in a case where the display screen transitions from that in the example shown in FIG. 8 to that in the example shown in FIG. 9, the display processing unit 405 can blink at least a part of the second region in the transition period including the timing of switching of the color and/or the pattern of the second region. In this case, the color and/or the pattern of the second region at the blinking is not limited to a specific color and/or a specific pattern, and whether to blink only a part of the second region or to blink substantially the entirety of the second region is not limited to a specific method.

Furthermore, in the embodiment, it is conceivable to adopt a configuration where when a candidate for the target position as in the example shown in FIG. 6 is selected, when the automatic parking ends as in the example shown in FIG. 8, and the like are regarded as the transition period, and the display mode of at least a part of at least one of the first region and the second region is changed in this transition period.

By the way, in the above description, the automatic parking is provided as an example of the proxy control; however, emergency stop such as forcibly braking the vehicle 1 can be also considered as another example of the proxy control. In a case where the control state of the vehicle 1 is emergency stop, since it is desirable to more powerfully call the occupant's attention, the display processing unit 405 displays a subsequently display screen such as an image 1000 shown in FIG. 10 on the display unit 8 such that the color and/or the pattern of the second region are different from those in the case of manual driving and those in the case of automatic parking.

Figure 10:
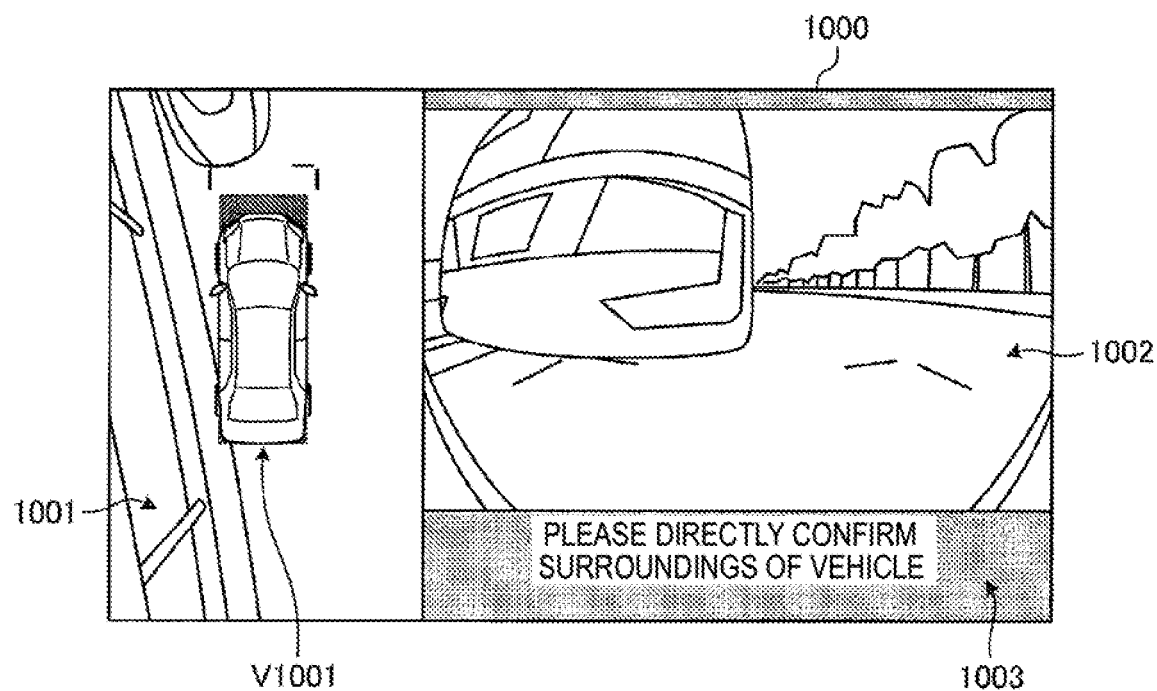
FIG. 10 is an exemplary and schematic view showing one example of a display screen when the vehicle makes an emergency stop in the embodiment.

FIG. 10 is an exemplary and schematic view showing one example of a display screen when the vehicle 1 makes an emergency stop in the embodiment. The screen layout of the image 1000 shown in FIG. 10 is basically the same as the screen layout of the image 500 shown in FIG. 5. Namely, in the image 1000 shown in FIG. 10, images 1001 and 1002 showing an overlook image and a single camera image of a region in front of the vehicle 1 are displayed in a region corresponding to the first region where surrounding images are displayed, and an image 1003 containing only a message to prompt the direct confirmation of the surroundings of the vehicle (namely, not containing a surrounding image) is displayed in a region corresponding to the second region where a background image other than a surrounding image is displayed. Incidentally, a vehicle image V1001 indicating the state of the vehicle 1 in the viewpoint of the image 1001 is displayed in the image 1001 showing an overlook image.

Here, in the embodiment, when the vehicle 1 makes an emergency stop, the color and/or the pattern of the second region are changed to be different from those in the case of manual driving and those in the case of automatic parking. Therefore, in the embodiment, as the control state of the vehicle 1 is switched to emergency stop, the color and/or the pattern of the image 1003 displayed in the region corresponding to the second region in the example shown in FIG. 10 become different from the color and/or the pattern of the images 503 and 903 displayed in the region corresponding to the second region in the examples shown in the FIGS. 5 and 9, and become different from the color and/or the pattern of the images 603, 703, and 803 displayed in the region corresponding to the second region in the examples shown in FIGS. 6 to 8.

As described above, according to the embodiment, in a case where the control state of the vehicle 1 is special proxy control such as emergency stop which is different from manual driving and automatic parking, it is possible to notify the occupant of this fact in a special mode that is different from that during the manual driving and that during the automatic parking.

Incidentally, also in a case where an image displayed as a surrounding image in the first region on a display screen is different from those in the examples shown in FIGS. 5 to 10, the above-described change in the display mode of the second region is similarly executed. Hereinafter, other examples of the display screen when the vehicle 1 is moving in the automatic parking mode will be simply described with reference to FIGS. 11 and 12.

Figure 11:
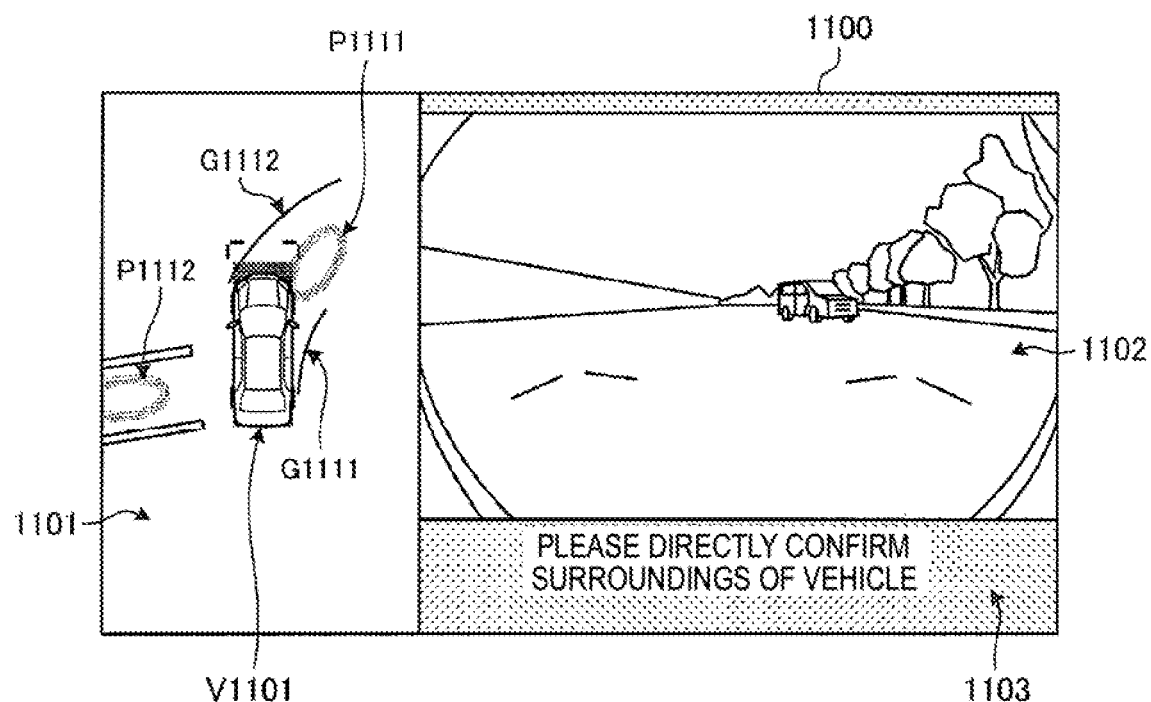
FIG. 11 is an exemplary and schematic view showing another example which is different from the display screen in FIG. 7 when the vehicle is moving in the automatic parking mode in the embodiment.

FIG. 11 is an exemplary and schematic view showing another example which is different from the display screen in FIG. 7 when the vehicle 1 is moving in the automatic parking mode in the embodiment. As shown in FIG. 11, when the vehicle 1 is moving in the automatic parking mode, the display processing unit 405 can display an image 1100 as a display screen on the display unit 8, and the image 1100 contains images 1101 and 1102 showing an overlook image and a single camera image of a region in front of the vehicle 1, and an image 1103 containing only a message to prompt the direct confirmation of the surroundings of the vehicle (namely, not containing a surrounding image).

Incidentally, in the example shown in FIG. 11, a vehicle image V1101 indicating the state of the vehicle 1 in the viewpoint of the image 1101, icons P1111 and P1112 indicating a turning position and a parking position as target positions which the vehicle 1 finally has to reach in the viewpoint of the image 1101, and guide lines G1111 and G1112 as guide displays which are guides to the travel path of the vehicle 1 are displayed in the image 1101 showing an overlook image.

Here, in the example shown in FIG. 11, regions where the images 1101 and 1102 are displayed in the image 1100 correspond to the first region where surrounding images are displayed, and a region where the image 1103 is displayed in the image 1100 corresponds to the second region where a background image other than a surrounding image is displayed. Similar to the example shown in FIG. 7, since the example shown in FIG. 11 corresponds to the display screen when the vehicle 1 is moving in the automatic parking mode, the color and/or the pattern of the image 1103 in the example shown in FIG. 11 are the same as the color and/or pattern of the image 703 in the example shown in FIG. 7.

Figure 12:
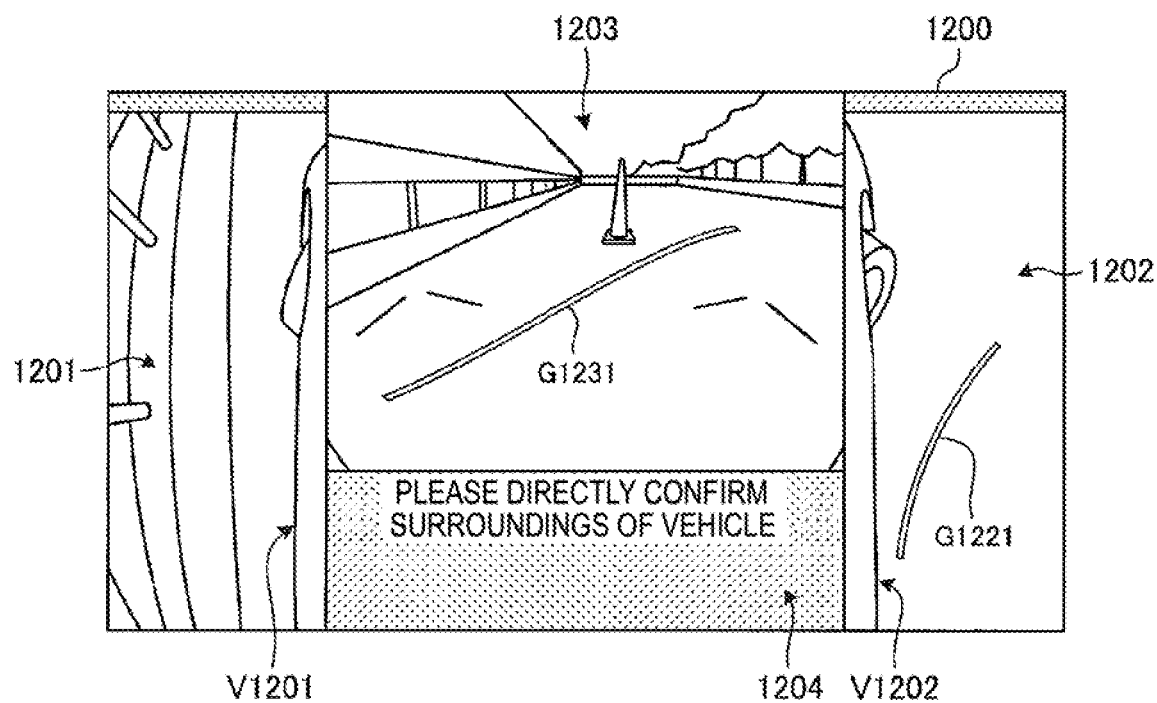
FIG. 12 is an exemplary and schematic view showing still another example which is different from the display screens in FIGS. 7 and 11 when the vehicle is moving in the automatic parking mode in the embodiment.

FIG. 12 is an exemplary and schematic view showing still another example which is different from the display screens in FIGS. 7 and 11 when the vehicle 1 is moving in the automatic parking mode in the embodiment. As shown in FIG. 12, when the vehicle 1 is moving in the automatic parking mode, the display processing unit 405 can display an image 1200 as a display screen on the display unit 8, and the image 1200 contains images 1201 and 1202 showing single camera images of regions on the right and left sides of the vehicle 1, an image 1203 showing a single camera image of a region in front of the vehicle 1, and an image 1204 containing only a message to prompt the direct confirmation of the surroundings of the vehicle (namely, not containing a surrounding image).

Incidentally, in the example shown in FIG. 12, vehicle images V1201 and V1202 indicating the state of the vehicle 1 in the viewpoints of the images 1201 and 1202 are displayed in the images 1201 and 1202 showing the single camera images of the regions on the right and left sides of the vehicle 1. In addition, a guide line G1221 as a guide display which is a guide to the travel path of the vehicle 1 is displayed in the image 1202 showing the single camera image of the region on the right side of the vehicle 1. A guide line G1231 which is a guide to the travel path of the vehicle 1 is also displayed in the image 1203 showing the single camera image of the region in front of the vehicle 1.

In the example shown in FIG. 12, regions where the images 1201 to 1203 are displayed in the image 1200 correspond to the first region where surrounding images are displayed, and a region where the image 1204 is displayed in the image 1200 corresponds to the second region where a background image other than a surrounding image is displayed. Similar to the example shown in FIG. 7, since the example shown in FIG. 12 also corresponds to the display screen when the vehicle 1 is moving in the automatic parking mode, the color and/or the pattern of the image 1204 in the example shown in FIG. 12 are the same as the color and/or pattern of the image 703 in the example shown in FIG. 7.

By the way, as described above, in the embodiment, the display processing unit 405 can display the guide displays such as the guide lines G711, G712, G1111, G1112, G1221, and G1231 in the examples shown in FIGS. 7, 11, and 12 which are guides to the travel path of the vehicle 1, together with the surrounding images. However, generally, there is a difference in the importance of recognizing the travel path of the vehicle 1 by the guide display between the manual driving in which a driving operation performed by the driver is positively required to control the traveling of the vehicle 1 and the proxy control in which a driving operation performed by the driver is not necessarily required to control the traveling of the vehicle 1.

Accordingly, in the embodiment, in a case where the display processing unit 405 displays a guide display together with a surrounding image, the display processing unit 405 changes the display mode of the guide display depending on whether or not the proxy control is executed.

Figure 13:
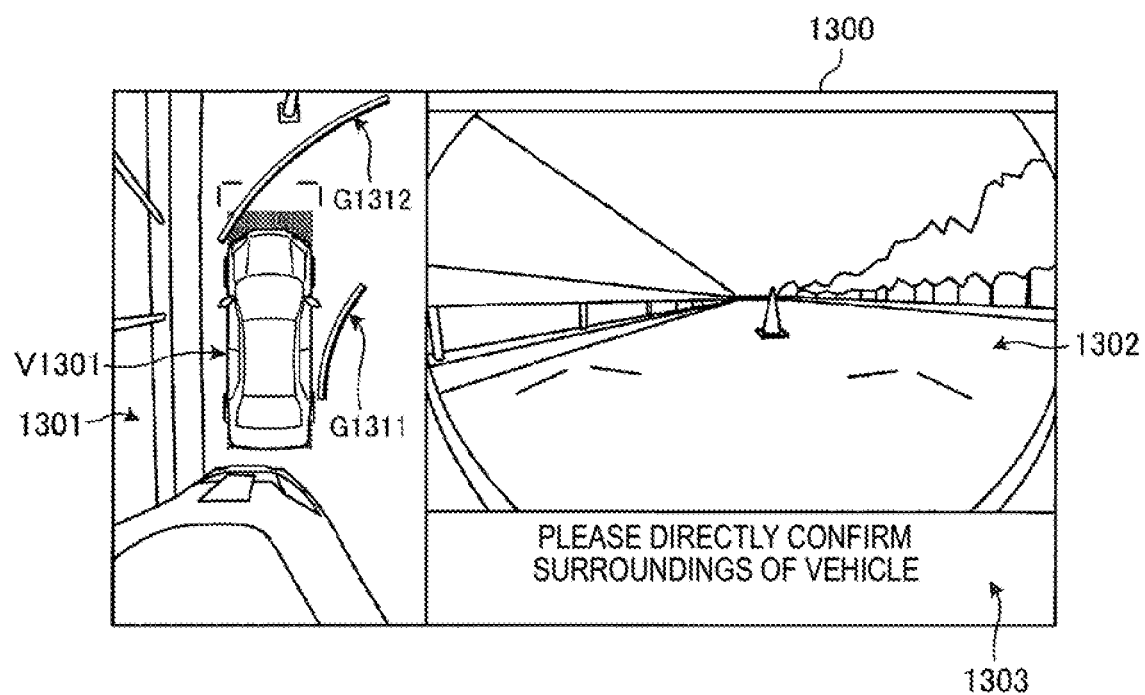
FIG. 13 is an exemplary and schematic view showing an example of a guide display during manual driving in the embodiment.

FIG. 13 is an exemplary and schematic view showing an example of a guide display during manual driving in the embodiment. As shown in FIG. 13, during manual driving, the display processing unit 405 can display an image 1300 as a display screen on the display unit 8, and the image 1300 contains images 1301 and 1302 showing an overlook image and a single camera image of a region in front of the vehicle 1, and an image 1303 containing only a message to prompt the direct confirmation of the surroundings of the vehicle (namely, not containing a surrounding image). Regions where the images 1301 and 1302 are displayed in the image 1300 correspond to the first region where surrounding images are displayed, and a region where the image 1303 is displayed in the image 1300 corresponds to the second region where a background image other than a surrounding image is displayed.

Incidentally, in the example shown in FIG. 13, a vehicle image V1301 indicating the state of the vehicle 1 in the viewpoint of the image 1301 and guide lines G1311 and G1312 as guide displays which are guides to the travel path of the vehicle 1 are displayed in the image 1301 showing an overlook image. In addition, similar to the example shown in FIG. 5, since the example shown in FIG. 13 corresponds to the display screen during manual driving, the color and/or the pattern of the image 1303 in the example shown in FIG. 13 are the same as the color and/or pattern of the image 503 in the example shown in FIG. 5.

Here, the display mode of the guide displays (guide lines G1311 and G1312) in the example shown in FIG. 13 is different from that of the guide displays (guide lines G711, G712, G1111, G1112, G1221, and G1231) in the examples shown in FIGS. 7, 11, and 12. More specifically, the guide displays in the example shown in FIG. 13 are displayed as shaded lines so as to stand out than the guide displays in the examples shown in FIGS. 7, 11, and 12. Therefore, according to the embodiment, it becomes easy for the driver to recognize the travel path of the vehicle 1 during manual driving. Incidentally, in the embodiment, a technique of changing the color, transparency, thickness, or the like of a line can be also considered as another technique of changing the display mode of the guide display.

Hereinafter, a process executed by the display controller 400 according to the embodiment will be described with reference to FIG. 14.

Figure 14:
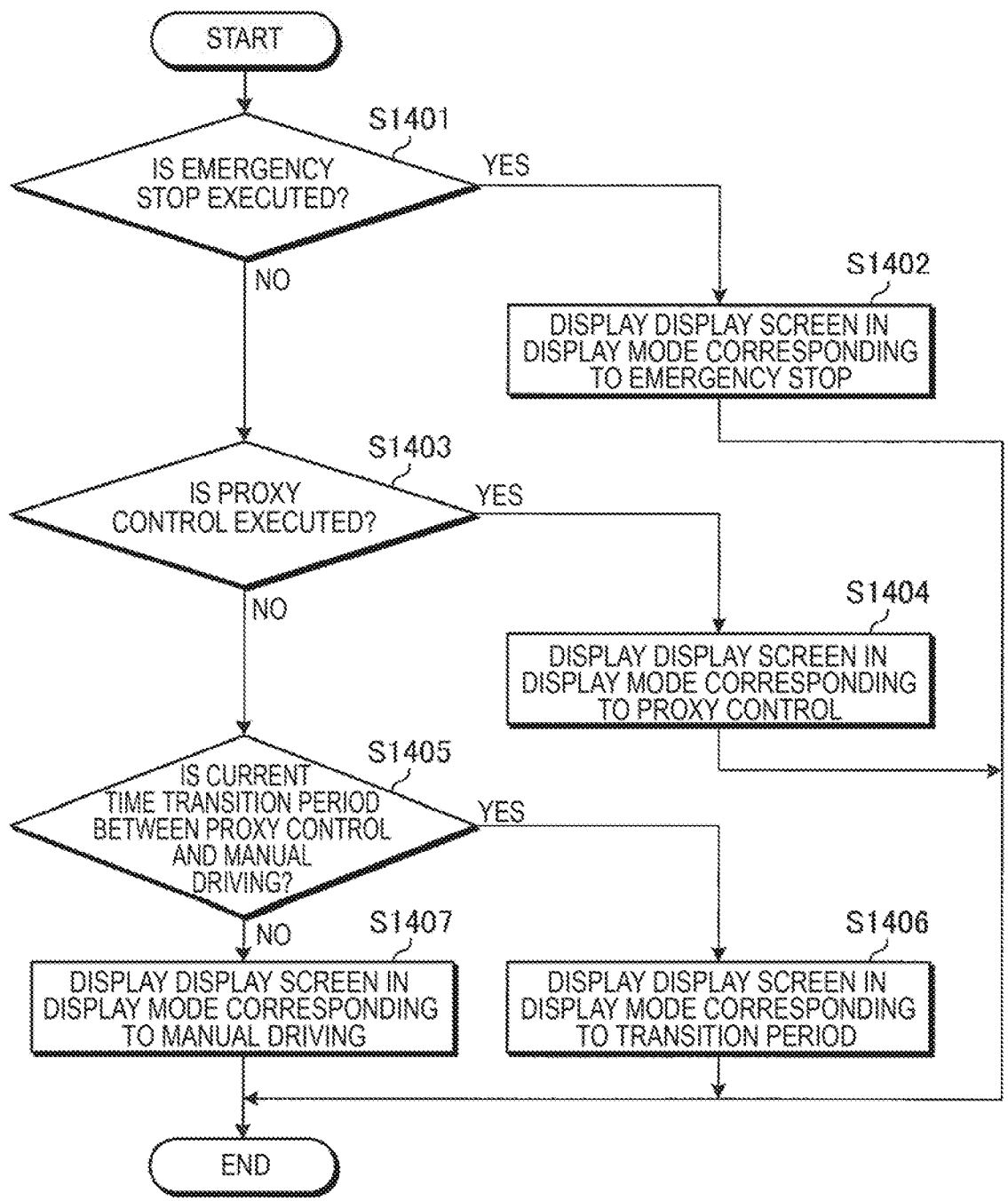
FIG. 14 is an exemplary and schematic flowchart showing a series of steps that are executed to display a display screen by the display controller according to the embodiment.

FIG. 14 is an exemplary and schematic flowchart showing a series of steps that are executed to display a display screen by the display controller 400 according to the embodiment. The series of steps shown in FIG. 14 are repeatedly executed under situations which require monitoring the surroundings of the vehicle 1.

As shown in FIG. 14, in the embodiment, firstly, in S1401, the display processing unit 405 of the display controller 400 determines whether or not emergency stop is executed by the proxy control unit 402.

In S1401, in a case where it is determined that the emergency stop is executed, the process proceeds to S1402. Then, in S1402, the display processing unit 405 of the display controller 400 displays a display screen in a display mode corresponding to the emergency stop, for example, in a display mode where the color and/or the pattern of the second region are set as in the example shown in FIG. 10. Then, the process ends.

On the other hand, in S1401, in a case where it is determined that the emergency stop is not executed, the process proceeds to S1403. Then, in S1403, the display processing unit 405 of the display controller 400 determines whether or not proxy control other than the emergency stop is executed.

In S1403, in a case where it is determined that proxy control other than the emergency stop is executed, the process proceeds to S1404. Then, in S1404, the display processing unit 405 of the display controller 400 displays a display screen in a display mode corresponding to proxy control other than the emergency stop, for example, in a display mode where the color and/or the pattern of the second region are set as in the examples shown in FIGS. 6 to 8 and FIGS. 11 and 12. Then, the process ends.

On the other hand, in S1403, in a case where it is determined that proxy control other than the emergency stop is not executed, the process proceeds to S1405. Then, in S1405, the display processing unit 405 of the display controller 400 determines whether or not the current time falls within the transition period between proxy control and manual driving.

In S1405, in a case where it is determined that the current time falls within the transition period, the process proceeds to S1406. Then, in S1406, the display processing unit 405 of the display controller 400 displays a display screen in a display mode corresponding to the transition period, for example, in a display mode where the second region of which the color and/or the pattern are subjected to change is blinked. Then, the process ends.

On the other hand, in S1405, in a case where it is determined that the current time does not fall within the transition period, it can be determined that the control state of the vehicle 1 at the current time is the manual driving. Therefore, in this case, the process proceeds to S1406, and in S1406, the display processing unit 405 of the display controller 400 displays a display screen in a display mode corresponding to the manual driving, for example, in a display mode where the color and/or the pattern of the second region are set as in the examples shown in FIGS. 5, 9, and 13. Then, the process ends.

As described above, the display controller 400 according to the embodiment includes the image data acquisition unit 403 and the display processing unit 405. The image data acquisition unit 403 acquires image data as a result of capturing an image with the in-vehicle camera 15 which is an image capturing unit that captures an image of the situation around the vehicle 1. The display processing unit 405 displays a display screen which includes the first region displaying a surrounding image that is generated based on the image data to indicate the situation around the vehicle 1 and the second region other than the first region, on the display unit 8. The display processing unit 405 changes the display mode of at least a part of at least one of the first region and the second region on the display screen depending on whether or not proxy control is executed to perform at least a part of the driving operation of the vehicle 1 by proxy for the driver.

The display controller 400 according to the embodiment can notify the occupant of the control state of the vehicle 1 together with the situation around the vehicle 1 in a more easily recognizable manner by using the display screen of which the display mode of at least a part is changed depending on whether or not proxy control is executed.

In the display controller 400 according to the embodiment, the display processing unit 405 can execute a change in at least the color or pattern of at least a part of the second region as a change in the display mode of the at least a part of the second region. According to the above-described configuration, it is possible to easily change the display mode of the at least a part of the second region by changing at least the color or the pattern.

In addition, in the display controller 400 according to the embodiment, the display processing unit 405 can further change the display mode of at least a part of at least one of the first region and the second region in the transition period between a state where the proxy control is executed and a state where the proxy control is not executed. More specifically, the display processing unit 405 can blink at least a part of at least one of the first region and the second region in the transition period. According to the above-described configuration, it is possible to notify the occupant of the transition period between a state where the proxy control is executed and a state where the proxy control is not executed.

In addition, in the display controller 400 according to the embodiment, the display processing unit 405 can display a guide display which is a guide to the travel path of the vehicle 1, together with a surrounding image, in the first region, and change the display mode of the guide display depending on whether or not the proxy control is executed. According to the above-described configuration, it is possible to easily notify the occupant of the control state of the vehicle 1 by changing the display mode of the guide display.

Incidentally, the display control program executed by the controller 310 according to the embodiment may be provided or distributed via a network such as Internet. Namely, the display control program executed by the controller 310 according to the embodiment may be provided in a form where the display control program is stored in a computer connected to the network such as Internet and is downloaded via the network.

Modification Examples

In the above-described embodiment, several screen layouts of the display screens shown in FIGS. 5 to 13 are provided merely as examples. The technique of the embodiment can be applied to the screen layout of any display screen as long as the display screen has the first region where a surrounding image is displayed and the second region where a background image other than the surrounding image is displayed.

In addition, in the above-described embodiment, the configuration where a change in the display mode according to a change in the control state of the vehicle 1 is executed for the second region where the background image other than the surrounding image is displayed is provided as an example. However, as in the following first modification example shown in FIGS. 15 and 16, a change in the display mode according to a change in the control state of the vehicle 1 may be executed for the first region where a surrounding image is displayed. Incidentally, a change in the display mode of the first region is realized as at least a color change without including a pattern change such that the visibility of the surrounding image is not deteriorated.

Figure 15:
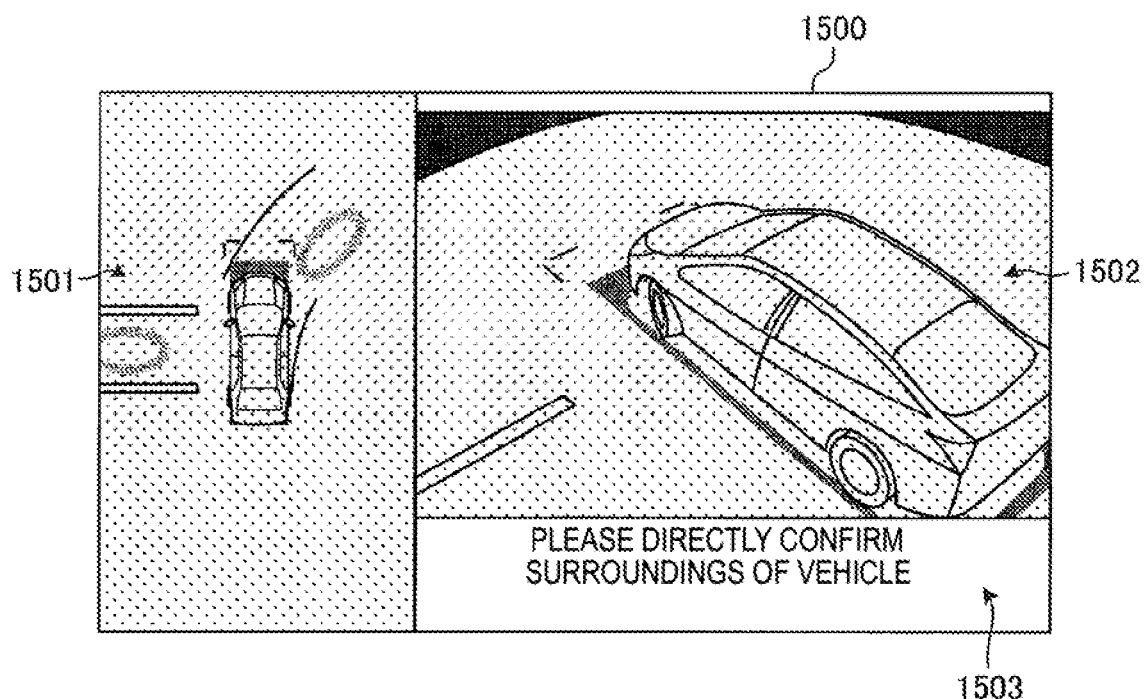
FIG. 15 is an exemplary and schematic view showing one example of a display screen when the vehicle is moving in the automatic parking mode in a first modification example of the embodiment.

FIG. 15 is an exemplary and schematic view showing one example of a display screen when the vehicle 1 is moving in the automatic parking mode in the first modification example of the embodiment. As shown in FIG. 15, when the vehicle 1 is moving in the automatic parking mode, the display processing unit 405 can display an image 1500 as a display screen on the display unit 8, and the image 1500 contains images 1501 and 1502 showing an overlook image and a single camera image of a region in front of the vehicle 1, and an image 1503 containing only a message to prompt the direct confirmation of the surroundings of the vehicle (namely, not containing a surrounding image). In the example shown in FIG. 15, regions where the images 1501 and 1502 are displayed correspond to the first region where surrounding images are displayed, and a region where the image 1503 is displayed corresponds to the second region where a background image other than a surrounding image is displayed.

Here, in the first modification example, a change in the display mode according to a change in the control state of the vehicle 1 is not executed for the second region but executed for the first region. Therefore, when compared to the example shown in FIG. 7 which is common with this modification example in that the display screen when the vehicle 1 is moving in the automatic parking mode is displayed, in the example shown in FIG. 15, a color is added to both of two images 1501 and 1502 showing the surrounding images that are displayed in the first region, and the color and/or the pattern added to the image 1503 showing the background image which is displayed in the second region are removed. Similar to the above-described embodiment, with the above-described display screen, it is possible to easily notify that the control state of the vehicle 1 is proxy control.

Incidentally, in the first modification example, in a case where the control state of the vehicle 1 is manual driving, the color added to the first region is removed. In addition, in the first modification example, in a case where the control state of the vehicle 1 is emergency stop, as in the following example shown in FIG. 16, a color which is different from that in the example shown in FIG. 15 is added to the first region.

Figure 16:
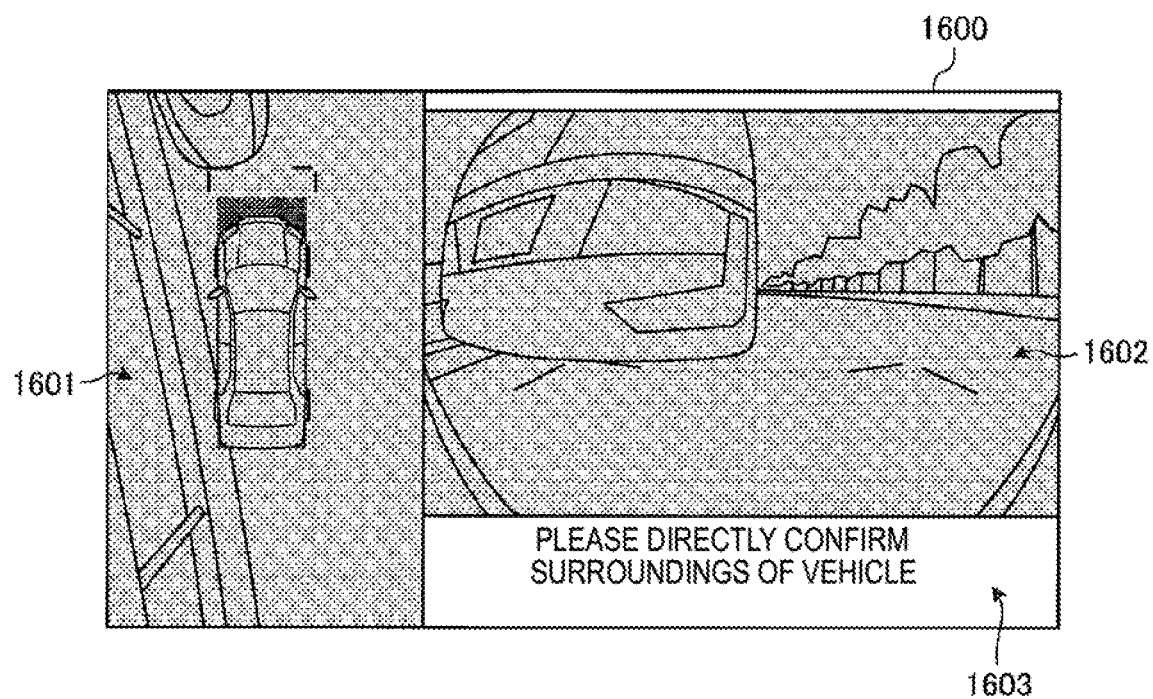
FIG. 16 is an exemplary and schematic view showing one example of a display screen when the vehicle makes an emergency stop in the first modification example of the embodiment.

FIG. 16 is an exemplary and schematic view showing one example of a display screen when the vehicle 1 makes an emergency stop in the first modification example of the embodiment. The screen layout of an image 1600 shown in FIG. 16 is the same as the screen layout of the image 1000 shown in FIG. 10. Namely, in the image 1600 shown in FIG. 16, images 1601 and 1602 showing an overlook image and a single camera image of a region in front of the vehicle 1 are displayed in a region corresponding to the first region where surrounding images are displayed, and an image 1603 containing only a message to prompt the direct confirmation of the surroundings of the vehicle (namely, not containing a surrounding image) is displayed in a region corresponding to the second region where a background image other than a surrounding image is displayed.

In the first modification example, in a case where the control state of the vehicle 1 is emergency stop, a color which is different from that in the case of manual driving and that in the case of proxy control other than the emergency stop is added to the first region. Therefore, in the example shown in FIG. 16, the color added to the images 1601 and 1602 showing the surrounding images is different from the color added to the images 1501 and 1502 showing the surrounding images in the example shown in FIG. 15. Similar to the above-described embodiment, with the above-described display screen, it is possible to powerfully call attention to that emergency stop is executed.

Incidentally, in the first modification example described above, the technique of adding a color to both of two images showing surrounding images displayed in the first region depending on the control state of the vehicle 1 is provided as an example. However, as in the following second modification example shown in FIG. 17, only one of two images may become a target surrounding image to which a color is added depending on the control state of the vehicle 1.

Figure 17:
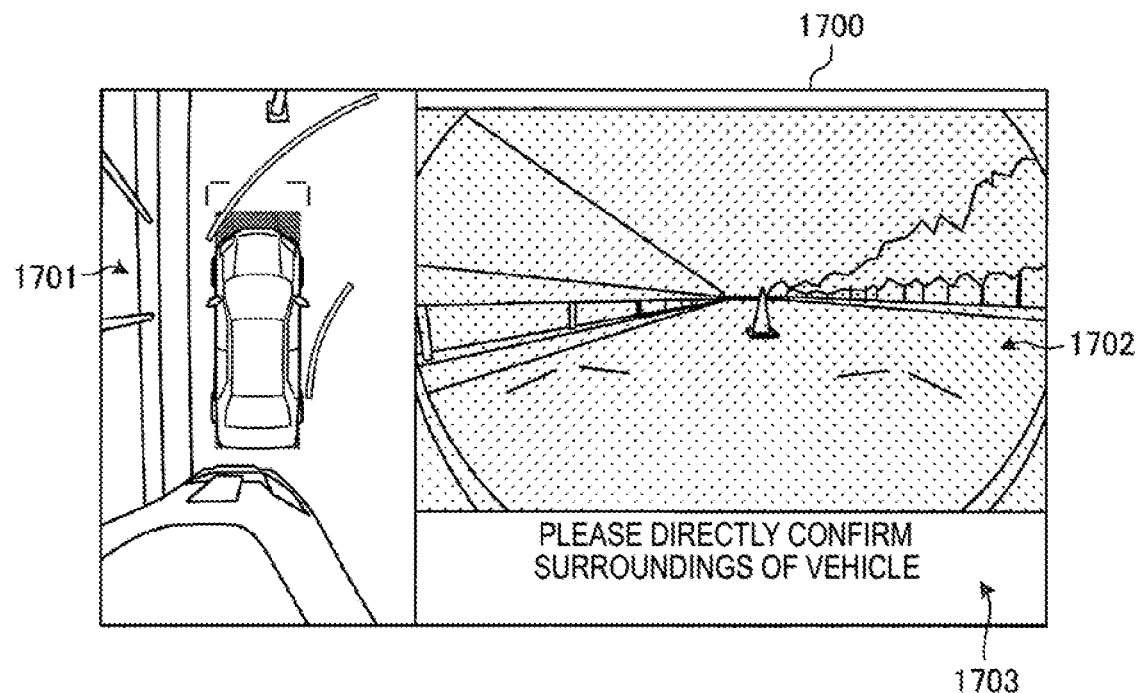
FIG. 17 is an exemplary and schematic view showing one example of a display screen when the vehicle is moving in the automatic parking mode in a second modification example of the embodiment.

FIG. 17 is an exemplary and schematic view showing one example of a display screen when the vehicle 1 is moving in the automatic parking mode in the second modification example of the embodiment. The screen layout of an image 1700 shown in FIG. 17 is the same as the screen layout of the image 1600 shown in FIG. 16. Namely, in the image 1700 shown in FIG. 17, images 1701 and 1702 showing an overlook image and a single camera image of a region in front of the vehicle 1 are displayed in a region corresponding to the first region where surrounding images are displayed, and an image 1703 containing only a message to prompt the direct confirmation of the surroundings of the vehicle (namely, not containing a surrounding image) is displayed in a region corresponding to the second region where a background image other than a surrounding image is displayed.

In the example shown in FIG. 17, a color is added to only the image 1702 (however, substantially the entirety of the image 1702) of the images 1701 and 1702 that are displayed as the surrounding images in the first region. Similar to the embodiment and the first modification example described above, also with the above-described display screen, it is possible to easily notify that the control state of the vehicle 1 is proxy control (other than emergency stop).

Incidentally, in the second modification example described above, the technique of adding a color to substantially the entire surrounding image displayed in the first region depending on the control state of the vehicle 1 is provided as an example. However, as in the following third modification example shown in FIG. 18, a partial region of a surrounding image may become a target to which a color is added depending on the control state of the vehicle 1.

Figure 18:
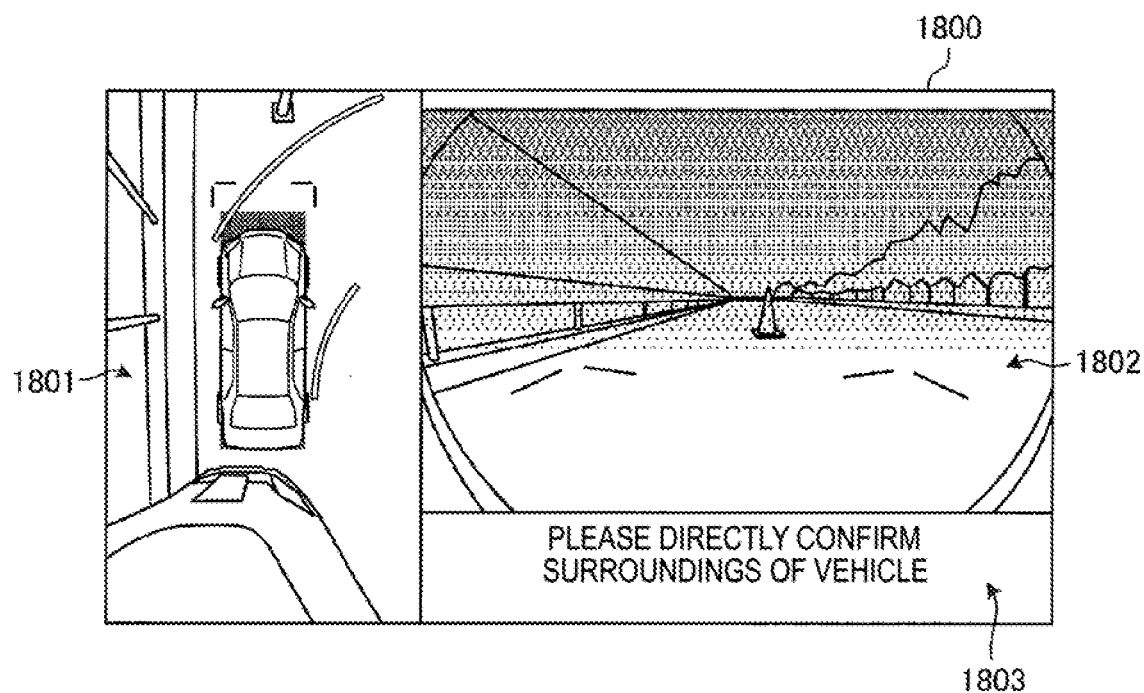
FIG. 18 is an exemplary and schematic view showing one example of a display screen when the vehicle is moving in the automatic parking mode in a third modification example of the embodiment.

FIG. 18 is an exemplary and schematic view showing one example of a display screen when the vehicle 1 is moving in the automatic parking mode in the third modification example of the embodiment. The screen layout of an image 1800 shown in FIG. 18 is the same as the screen layout of the image 1700 shown in FIG. 17. Namely, in the image 1800 shown in FIG. 18, images 1801 and 1802 showing an overlook image and a single camera image of a region in front of the vehicle 1 are displayed in a region corresponding to the first region where surrounding images are displayed, and an image 1803 containing only a message to prompt the direct confirmation of the surroundings of the vehicle (namely, not containing a surrounding image) is displayed in a region corresponding to the second region where a background image other than a surrounding image is displayed.

In the example shown in FIG. 18, a color is added to only an upper half of the image 1802 of the images 1801 and 1802 that are displayed as the surrounding images in the first region. Incidentally, the color added to the upper half of the image 1802 is not limited to a gradient color as in the example shown in FIG. 18, and may be a uniform color. Similar to the embodiment, the first modification example, and the second modification example which are described above, also with the above-described display screen, it is possible to easily notify that the control state of the vehicle 1 is proxy control (other than emergency stop).

Incidentally, in the embodiment and the modification examples described above, the display mode of only either one of the first region and the second region is changed depending on the control state of the vehicle 1; however, both of the first region and the second region may become targets of which the display modes are changed depending on the control state of the vehicle 1.

Furthermore, in the embodiment and the modification examples described above, the execution of a change in the display mode of the first region and/or the second region is triggered by a change in the control state of the vehicle 1. However, according to the same idea as those in the embodiment and the modification examples described above, a change in the display mode of the first region and/or the second region can be also executed in response to a change in various situations such as whether or not an obstacle is detected and a change in weather.

As shown below in FIGS. 19 and 20, for example, a configuration where the display mode of a part of the first region is changed in response to the detection of an obstacle can be considered as a fourth modification example.

Figure 19:
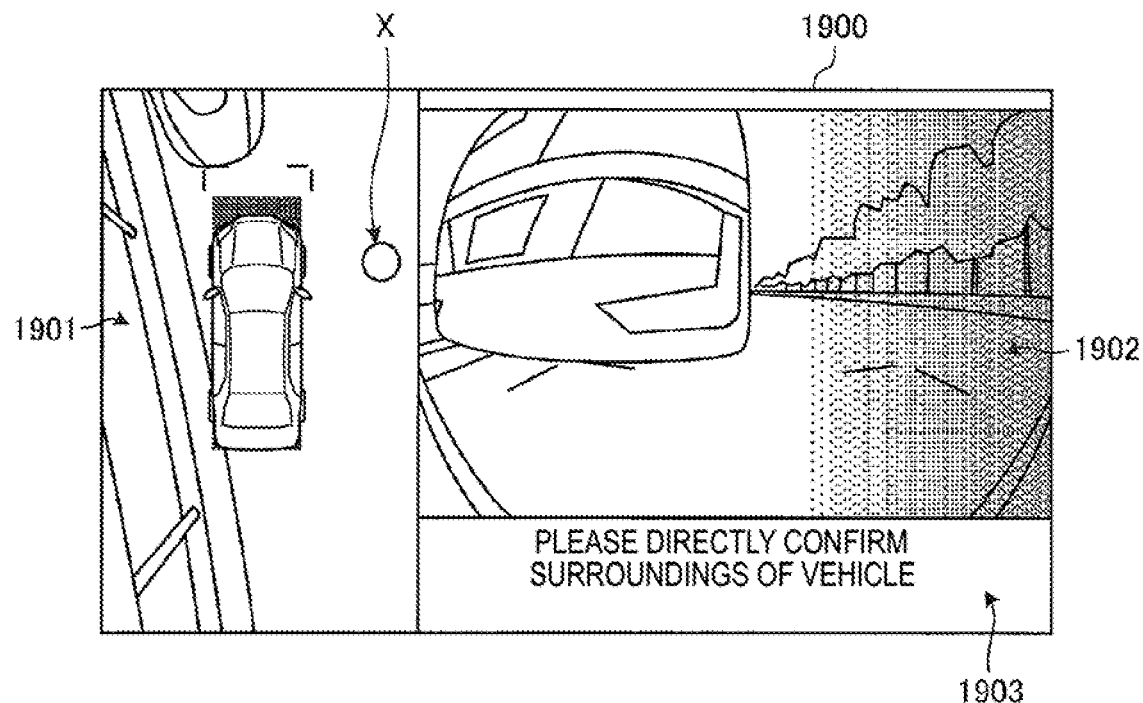
FIG. 19 is an exemplary and schematic view showing one example of a display screen when the vehicle approaches an obstacle in a fourth modification example of the embodiment.

FIG. 19 is an exemplary and schematic view showing one example of a display screen when the vehicle 1 approaches an obstacle in the fourth modification example of the embodiment. The screen layout of an image 1900 shown in FIG. 19 is the same as the screen layout of the image 1000 shown in FIG. 10. Namely, in the image 1900 shown in FIG. 19, images 1901 and 1902 showing an overlook image and a single camera image of a region in front of the vehicle 1 are displayed in a region corresponding to the first region where surrounding images are displayed, and an image 1903 containing only a message to prompt the direct confirmation of the surroundings of the vehicle (namely, not containing a surrounding image) is displayed in a region corresponding to the second region where a background image other than a surrounding image is displayed. Incidentally, an object X displayed in the image 1901 shows an obstacle such as a human or a structure which is detected on the right side of the vehicle 1.

In the fourth modification example, the display mode of a partial region in which the obstacle is detected in the image 1902 showing the single camera image of the region in front of the vehicle 1 is changed in response to the detection of the obstacle. Therefore, in the example shown in FIG. 19, a predetermined gradient color is added to the partial region (namely, a region on the right side of the vehicle 1) in which the obstacle is detected in the image 1902. With the above-described display screen, it is possible to easily notify the fact that the obstacle is detected and the position (direction) of the obstacle with respect to that of the vehicle 1.

Here, the size of the partial region of which the display mode is subjected to the above-described change can be changed depending on the degree of approach of the vehicle 1 to the obstacle. Namely, when the vehicle 1 further approaches the obstacle in a state where the display screen as in the example shown in FIG. 19 is displayed on the display unit 8, the size of the partial region of which the display mode is subjected to change becomes large. Then, when the approach of the vehicle 1 to the obstacle further proceeds, the emergency stop of the vehicle 1 is executed, and as a result, as shown below in FIG. 20, a display screen corresponding to the emergency stop of the vehicle 1 is displayed on the display unit 8.

Figure 20:
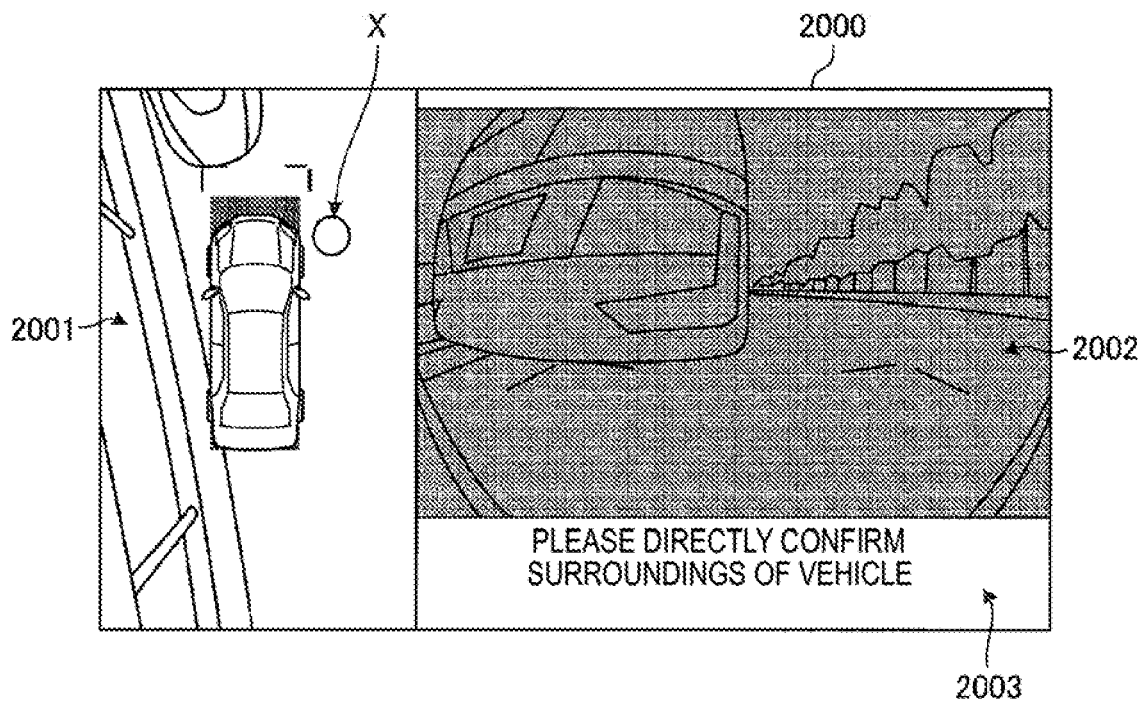
FIG. 20 is an exemplary and schematic view showing one example of a display screen when the vehicle makes an emergency stop in the fourth modification example of the embodiment.

FIG. 20 is an exemplary and schematic view showing one example of a display screen when the vehicle 1 makes an emergency stop in the fourth modification example of the embodiment. The screen layout of an image 2000 shown in FIG. 20 is the same as the screen layout of the image 1900 shown in FIG. 19. Namely, in the image 2000 shown in FIG. 20, images 2001 and 2002 showing an overlook image and a single camera image of a region in front of the vehicle 1 are displayed in a region corresponding to the first region where surrounding images are displayed, and an image 2003 containing only a message to prompt the direct confirmation of the surroundings of the vehicle (namely, not containing a surrounding image) is displayed in a region corresponding to the second region where a background image other than a surrounding image is displayed. Incidentally, the object X displayed in the image 2001 shows an obstacle that is detected on the right side of the vehicle 1.

Unlike the example shown in FIG. 19, in the example shown in FIG. 20, a color is added to the entirety of the image 2002. As described above, the approach of the vehicle 1 to the obstacle further proceeds in a state where the display screen as in the example shown in FIG. 19 is displayed on the display unit 8, and the size of a partial region of which the display mode is subjected to change becomes gradually large, and as a result, the above-described display screen is obtained. Therefore, with the transition of the display screen from that in the example shown in FIG. 19 to that in the example shown in FIG. 20, it is possible to easily notify that the vehicle 1 gradually approaches the obstacle and as a result, emergency stop is executed.

As described above, a "display controller including an image data acquisition unit that acquires image data as a result of capturing an image with an image capturing unit which captures an image of a situation around a vehicle; and a display processing unit that displays a display screen which includes the first region where a surrounding image based on the image data is displayed and the second region other than the first region, on a display unit, and changes the display mode of at least a part of at least one of the first region and the second region on the display screen depending on a change in the vehicle and the situation around the vehicle" can be also considered as a technique based on the same idea as those in the embodiment and the modification examples described above. According to this technique, for example, it is possible to notify the occupant of a change in the vehicle and the situation around the vehicle which includes the control state of the vehicle, together with the situation around the vehicle, in a more easily recognizable manner by using the display screen of which the display mode of at least a part is changed depending on the change in the vehicle and the situation around the vehicle.

In above description, the embodiment and the modification examples are disclosed, and the embodiment and the modification examples described above are merely examples, and are not intended to limit the scope disclosed here. The embodiments and modification examples described above can be realized in various new forms, and various omissions, replacements, and changes can be made thereto without departing from the concept disclosed here. The embodiment and the modification examples described above are included in the scope and the concept disclosed here, and are included in the claims disclosed here and the equivalent scope.

A display controller as an example of this disclosure includes an image data acquisition unit that acquires image data as a result of capturing an image with an image capturing unit which captures an image of a situation around a vehicle; and a display processing unit that displays a display screen which includes a first region displaying a surrounding image that is generated based on the image data and indicates the situation around the vehicle and a second region other than the first region on a display unit, and changes a display mode of at least a part of at least one of the first region and the second region on the display screen depending on whether or not proxy control is executed to perform at least a part of a driving operation of the vehicle by proxy for a driver.

According to the above-described display controller, it is possible to notify an occupant of the control state of the vehicle together with the situation around the vehicle in a more easily recognizable manner by using the display screen of which the display mode of at least a part is changed depending on whether or not the proxy control is executed.

In the above-described display controller, the display processing unit may execute a change in at least a color or a pattern of at least a part of the second region as a change in a display mode of the at least a part of the second region. According to the above-described configuration, it is possible to easily change the display mode of the at least a part of the second region by changing at least the color or the pattern.

In the above-described display controller, the display processing unit may execute a change in at least a color of at least a part of the surrounding image displayed in the first region as a change in a display mode of the at least a part of the surrounding image displayed in the first region. According to the above-described configuration, it is possible to easily execute a change in the display mode of at least a part of the first region by changing at least the color.

In the above-described display controller, the display processing unit may further change the display mode of the at least a part of at least one of the first region and the second region in a transition period between a state where the proxy control is executed and a state where the proxy control is not executed. According to the above-described configuration, it is possible to notify the occupant of the transition period between a state where the proxy control is executed and a state where the proxy control is not executed.

In this case, the display processing unit may blink the at least a part of at least one of the first region and the second region in the transition period. According to the above-described configuration, it is possible to easily notify the occupant of the transition period by blinking.

In the above-described display controller, the display processing unit may display a guide display which is a guide of a travel path of the vehicle, together with the surrounding image, in the first region, and change a display mode of the guide display depending on whether or not the proxy control is executed. According to the above-described configuration, it is possible to easily notify the occupant of the control state of the vehicle by changing the display mode of the guide display.

A display controller as another example of this disclosure includes an image data acquisition unit that acquires image data as a result of capturing an image with an image capturing unit which captures an image of a situation around a vehicle; and a display processing unit that displays a display screen which includes a first region where a surrounding image based on the image data is displayed and a second region other than the first region, on a display unit, and changes a display mode of at least a part of at least one of the first region and the second region on the display screen depending on a change in the vehicle and the situation around the vehicle.

According to the above-described display controller, for example, it is possible to notify the occupant of a change in the vehicle and the situation around the vehicle which includes the control state of the vehicle, together with the situation around the vehicle, in a more easily recognizable manner by using the display screen of which the display mode of at least a part is changed depending on the change in the vehicle and the situation around the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A display controller comprising:
   an image data acquisition unit that acquires image data as a result of capturing an image with an image capturing unit which captures an image of a situation around a vehicle; and
   a display processing unit that displays a display screen which includes a first region displaying a surrounding image that is generated based on the image data and indicates the situation around the vehicle, and a second region other than the first region on a display unit, and changes a display mode of at least a part of the second region on the display screen depending on whether or not proxy control is executed to perform at least a part of a driving operation for operating the motion of the vehicle to automatic control by proxy for a driver;
   a surrounding image is displayed only in a first region being displayed.

2. The display controller according to claim 1, wherein the display processing unit executes a change in at least a color or a pattern of at least a part of the second region as a change in a display mode of the at least a part of the second region.

3. The display controller according to claim 1, wherein the display processing unit executes a change in at least a color of at least a part of the surrounding image displayed in the first region as a change in a display mode of the at least a part of the surrounding image displayed in the first region.

4. The display controller according to claim 1, wherein
the display processing unit further changes the display
mode of the at least a part of at least one of the first
region and the second region in a transition period
between a state where the proxy control is executed and
a state where the proxy control is not executed.

5. The display controller according to claim 4, wherein
the display processing unit blinks the at least a part of at
least one of the first region and the second region in the
transition period.

6. The display controller according to claim 1, wherein
the display processing unit displays a guide display which
is a guide of a travel path of the vehicle, together with
the surrounding image, in the first region, and changes
a display mode of the guide display depending on
whether or not the proxy control is executed.

* * * * *